(12) United States Patent
Furuya et al.

(10) Patent No.: US 10,444,501 B2
(45) Date of Patent: Oct. 15, 2019

(54) IMAGE DISPLAY DEVICE

(71) Applicant: Panasonic Intellectual Property Management Co., Ltd., Osaka (JP)

(72) Inventors: Hiroyuki Furuya, Osaka (JP); Akira Kurozuka, Osaka (JP); Yuta Yamamoto, Kyoto (JP); Susumu Uragami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/002,012

(22) Filed: Jun. 7, 2018

(65) Prior Publication Data
US 2018/0364480 A1    Dec. 20, 2018

(30) Foreign Application Priority Data

Jun. 20, 2017  (JP) ................................ 2017-120854
Oct. 2, 2017   (JP) ................................ 2017-192432

(51) Int. Cl.
*G02B 27/01*     (2006.01)
*G09G 3/02*      (2006.01)
(Continued)

(52) U.S. Cl.
CPC .......... *G02B 27/0149* (2013.01); *B60K 35/00* (2013.01); *G02B 26/105* (2013.01);
(Continued)

(58) Field of Classification Search
CPC .............. G02B 27/0149; G02B 26/105; G02B 27/0101; G02B 3/005; G02B 3/0068;
(Continued)

(56) References Cited

U.S. PATENT DOCUMENTS

2009/0160736 A1   6/2009  Shikita
2011/0075257 A1*  3/2011  Hua ..................... G02B 27/017
                                                                359/464
(Continued)

FOREIGN PATENT DOCUMENTS

JP    2009-150947    7/2009

OTHER PUBLICATIONS

Kajita, H. et al, "SkyAnchor: Optical Design for Anchoring Mid-air Images onto Physical Objects", UIST '16, Oct. 16-19, 2016, Tokyo, Japan, p. 415-423. (Year: 2016).*

*Primary Examiner* — Julie Anne Watko
(74) *Attorney, Agent, or Firm* — McDermott Will & Emery LLP

(57) ABSTRACT

The image display device further includes a scanning unit that uses light from the light source to scan the movable screen and the fixed screen, and an optical system that uses light from the movable screen and the fixed screen to generate a virtual image, a drive unit that moves the movable screen, a structure body that supports the fixed screen at a fixed position such that the fixed screen is closer to the optical system than the movable screen is, and a magnetic cover that covers a movable part of the drive unit. The structure body covers an area around an opening of the magnetic cover to shield the movable part of the drive unit from stray light travelling backward via the optical system.

7 Claims, 16 Drawing Sheets

(51) Int. Cl.
*G02B 26/10* (2006.01)
*G02B 26/08* (2006.01)
*B60K 35/00* (2006.01)
*H04N 9/31* (2006.01)
G02B 3/00 (2006.01)
B60K 37/00 (2006.01)

(52) U.S. Cl.
CPC ......... *G02B 27/0101* (2013.01); *G09G 3/025* (2013.01); *H04N 9/3129* (2013.01); *H04N 9/3164* (2013.01); *B60K 2370/334* (2019.05); *B60K 2370/52* (2019.05); *G02B 3/005* (2013.01); *G02B 3/0068* (2013.01); *G02B 26/0833* (2013.01); *G02B 2027/0118* (2013.01); *G02B 2027/0159* (2013.01); *G02B 2027/0185* (2013.01); *H04N 9/3108* (2013.01); *H04N 9/3135* (2013.01); *H04N 9/3155* (2013.01); *H04N 9/3161* (2013.01)

(58) Field of Classification Search
CPC ........ G02B 26/0833; G02B 2027/0118; G02B 2027/0159; G02B 2027/0185; G09G 3/025; H04N 9/3129; H04N 9/3164; H04N 9/3108; H04N 9/3135; H04N 9/3155; H04N 9/3161; B60K 2370/52; B60K 2370/334; B60K 35/00
See application file for complete search history.

(56) References Cited

U.S. PATENT DOCUMENTS

| | | | |
|---|---|---|---|
| 2015/0061976 A1* | 3/2015 | Ferri | G02B 27/0101 345/9 |
| 2016/0161833 A1* | 6/2016 | Watanabe | B60K 35/00 345/7 |
| 2016/0266283 A1* | 9/2016 | Segawa | G02B 3/0006 |
| 2017/0212347 A1* | 7/2017 | Uragami | G02B 27/0149 |
| 2017/0357088 A1* | 12/2017 | Matsuzaki | G02B 27/10 |
| 2018/0015876 A1* | 1/2018 | Yamagata | G03B 21/142 |
| 2018/0124364 A1* | 5/2018 | Yata | G02B 27/0101 |
| 2018/0231772 A1* | 8/2018 | Han | G02B 27/0101 |
| 2018/0356632 A1* | 12/2018 | Furuya | G02B 27/0101 |
| 2019/0086662 A1* | 3/2019 | Matsuzaki | G02B 27/0101 |
| 2019/0094537 A1* | 3/2019 | Choi | B60K 35/00 |
| 2019/0139286 A1* | 5/2019 | Shimoda | B60K 35/00 |

* cited by examiner

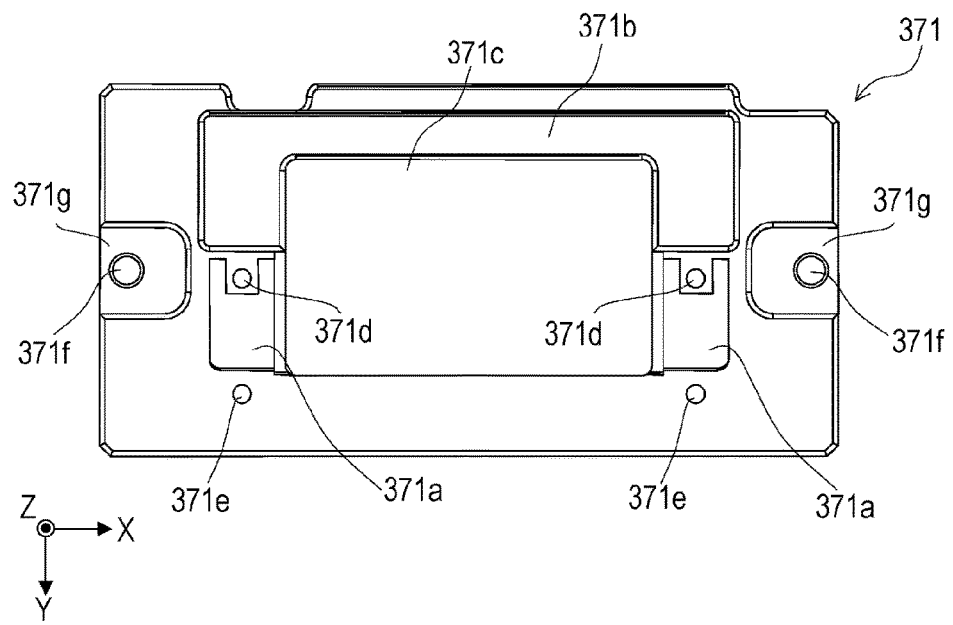
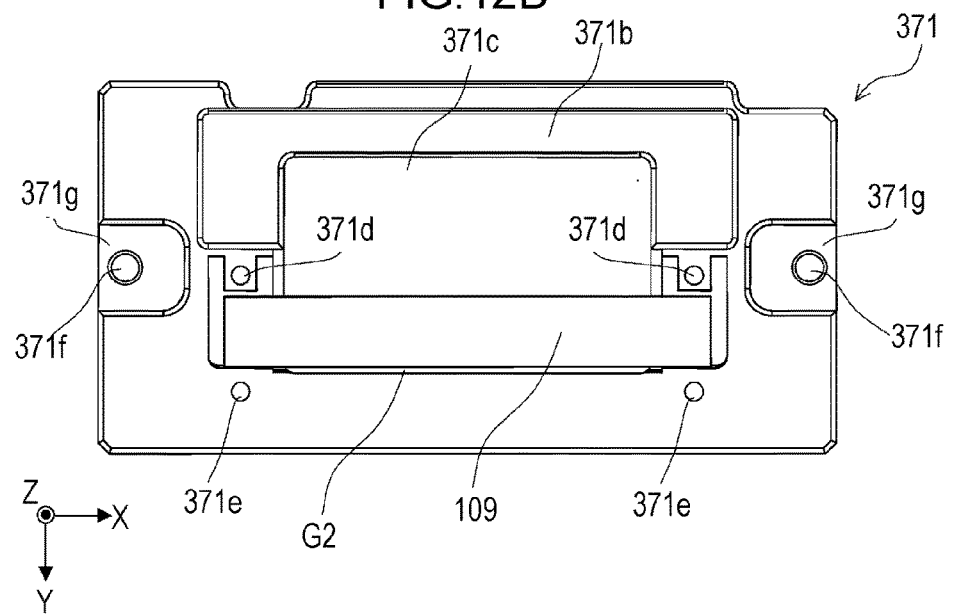

IMAGE DISPLAY DEVICE

BACKGROUND

1. Technical Field

The present disclosure relates to an image display device. For example, the present disclosure relates to an image display device suitable for being mounted on a moving body such as a passenger vehicle.

2. Description of the Related Art

In recent years, an image display device called a head-up display has been developed, and the head-up display has been mounted on a moving body such as a passenger vehicle. In the head-up display mounted on the passenger vehicle, light modulated based on image information is projected toward a windshield, and the light reflected by the windshield is applied to driver's eyes. This enables the driver to view a virtual image of an image in front of the windshield. For example, a vehicle speed or an outside air temperature is displayed as the virtual image. Recently, it is also considered to display, as a virtual image, a navigation image and an image for calling the attention on the passengers to the driver.

In the head-up display, a laser light source such as a semiconductor laser can be used as a light source to generate a virtual image. This configuration causes a screen to be scanned with laser light modulated based on a video signal. The screen diffuses the laser light to widen a range in which the laser light is applied to driver's eyes. This configuration prevents the driver's eyes from getting out of the irradiated region even if the driver moves his or her head to some extent, which allows the driver to view the image (virtual image) satisfactorily and stably.

PTL 1 discloses a configuration in which a screen is moved in an optical axis direction to vary an image-forming position of a virtual image in a front-back direction. In this configuration, a motor, a feed screw, and a rack are used for driving the screen.

CITATION LIST

Patent Literature

PTL 1: Unexamined Japanese Patent Publication No. 2009-150947

SUMMARY

A series of images are rendered on a screen that is being moved in an optical axis direction at a high speed. This enables display of an image whose visual distance varies in a depth direction (hereafter, referred to as a "depth image"). With this configuration, a depth image such as an arrow indicating a traveling direction of a vehicle can be displayed while being superimposed on a road at an intersection, for example.

Furthermore, an image is rendered on the screen that has been fixed. This enables display of an image whose visual distance is constant (hereafter, referred to as a "fixed image") at a position with a predetermined visual distance as a virtual image. With this configuration, information such as a vehicle speed or an outside air temperature can be displayed. In this case, a visual distance of the fixed image is set remarkably shorter than a visual distance of the depth image. For example, the visual distance of the depth image is set to about 10 m to about 100 m, and the visual distance of the fixed image is set to about 3 m. As described above, in a case where a range of the visual distance largely varies, when one screen is caused to display both the depth image and the fixed image, a movement range of the screen is remarkably extended. This makes it difficult to stably move the screen at a high speed.

This may further cause stray light such as natural light traveling backward via a projection optical system to enter the screen. In this case, the stray light is condensed to an area around the screen by the projection optical system, which results in the area around the screen being irradiated with the stray light of high intensity. This may cause a member located around the screen to be heated to a high temperature. Thus, it is required that the member located around the screen be protected from such stray light.

In light of the foregoing, an object of the present disclosure is to provide an image display device capable of moving a screen for generating a depth image smoothly at a high speed and suitably protecting a movable part located around the screen from stray light.

An image display device according to a primary aspect of the present disclosure includes a light source, a movable screen, a fixed screen, a scanning unit, an optical system, a drive unit, a fixed support part, and a cover. The movable screen is irradiated with light from the light source to form an image. The fixed screen is irradiated with the light from the light source to form an image. The scanning unit uses the light from the light source to scan the movable screen and the fixed screen. The optical system uses light from the movable screen and the fixed screen to generate a virtual image. The drive unit moves the movable screen in an incident direction of the light. The fixed support part supports the fixed screen at a fixed position such that the fixed screen is closer to the optical system than the movable screen is. The cover covers the drive unit. Herein, the cover has an opening that guides light from the scanning unit to the movable screen and the fixed screen. The drive unit supports the movable screen so as to allow the movable screen to protrude toward the optical system through the opening. The fixed support part covers an area around the opening to shield a movable part of the drive unit from stray light travelling backward via the optical system The image display device according to the present aspect is configured to move only the movable screen, which allows the movable screen to be moved only within a range necessary for a depth image to be displayed. Accordingly, the movable screen can be moved smoothly at a high speed. Furthermore, the fixed support part that supports the fixed screen covers the area around the opening of the cover to shield the movable part from the stray light travelling backward via the optical system, which makes it possible to prevent the area around the movable screen from being irradiated with the stray light of high intensity and then prevent the movable part located around the movable screen from being heated to a high temperature by the stray light. Accordingly, the movable part located around the movable screen can be suitably protected from the stray light.

Thus, the image display device according to the present aspect is capable of moving a screen for generating a depth image smoothly at a high speed and suitably protecting a movable part located around the screen from stray light.

As described above, the present disclosure can provide an image display device capable of moving a screen for generating a depth image smoothly at a high speed and suitably protecting a movable part located around the screen from stray light.

Effects or meanings of the present disclosed technology will be further clarified in the following description of the exemplary embodiment. However, the exemplary embodiment described below is merely an example of implementing the present disclosure, and the present disclosure is not at all limited to the examples described in the following exemplary embodiment.

Figure 7:
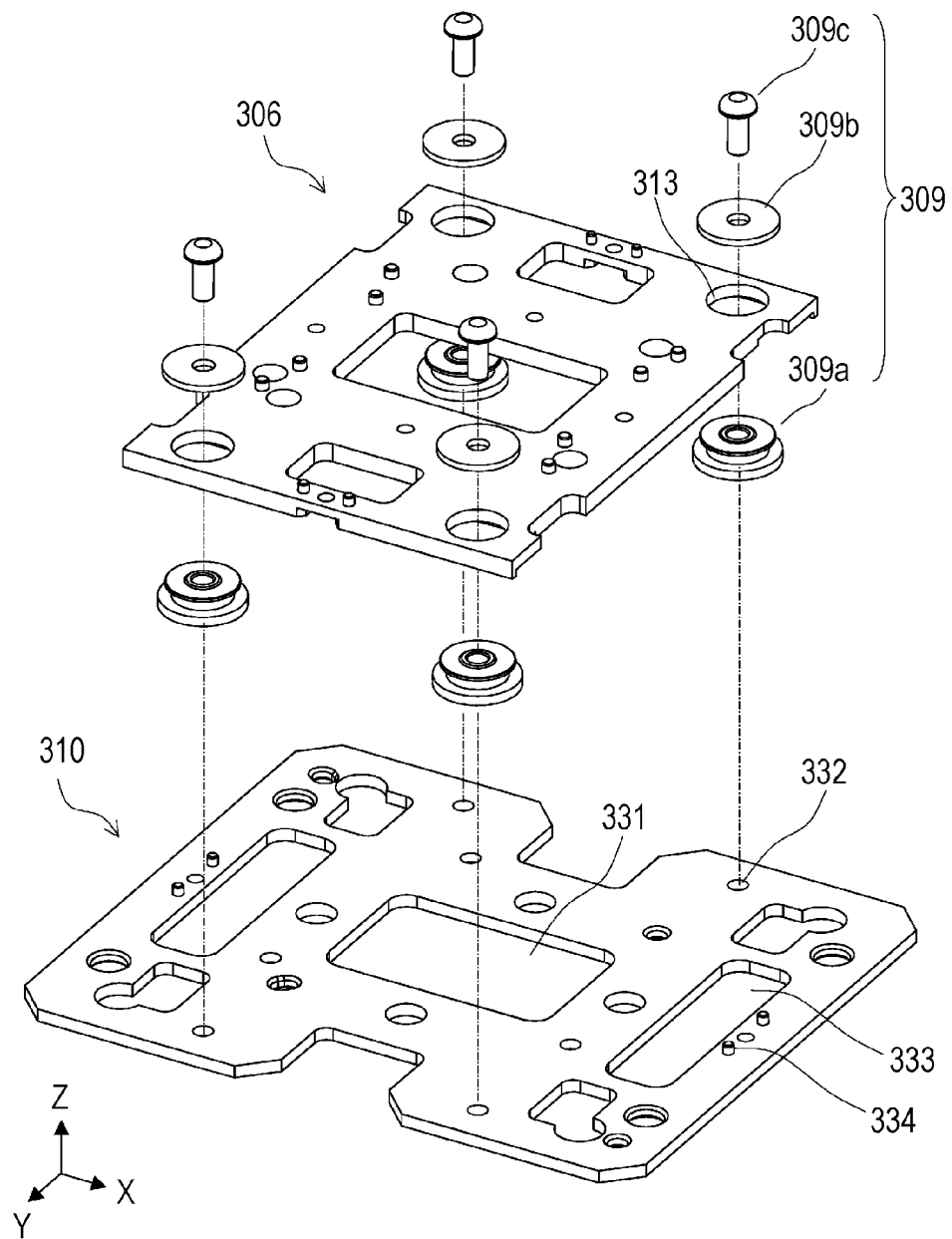
Figure 8A:
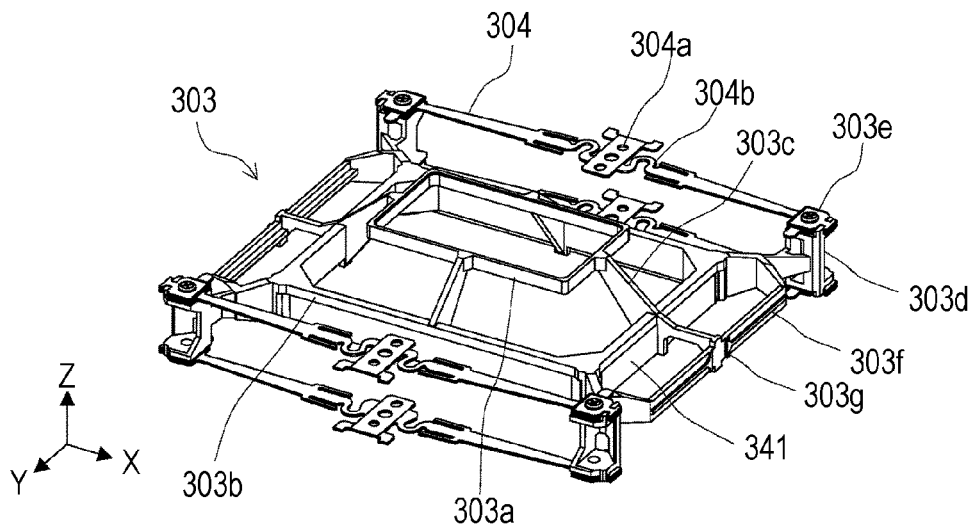
Figure 8B:
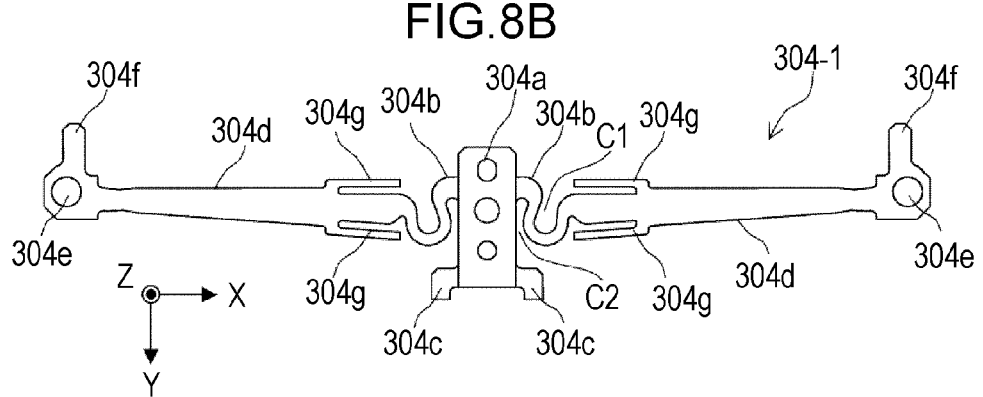
Figure 8C:
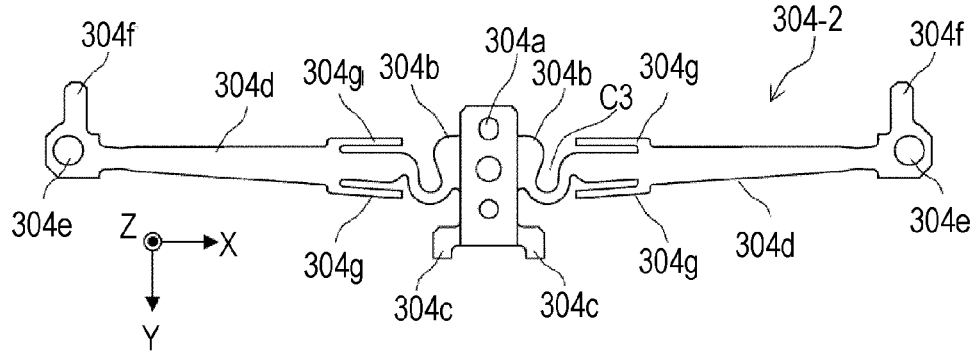
Figure 9A:
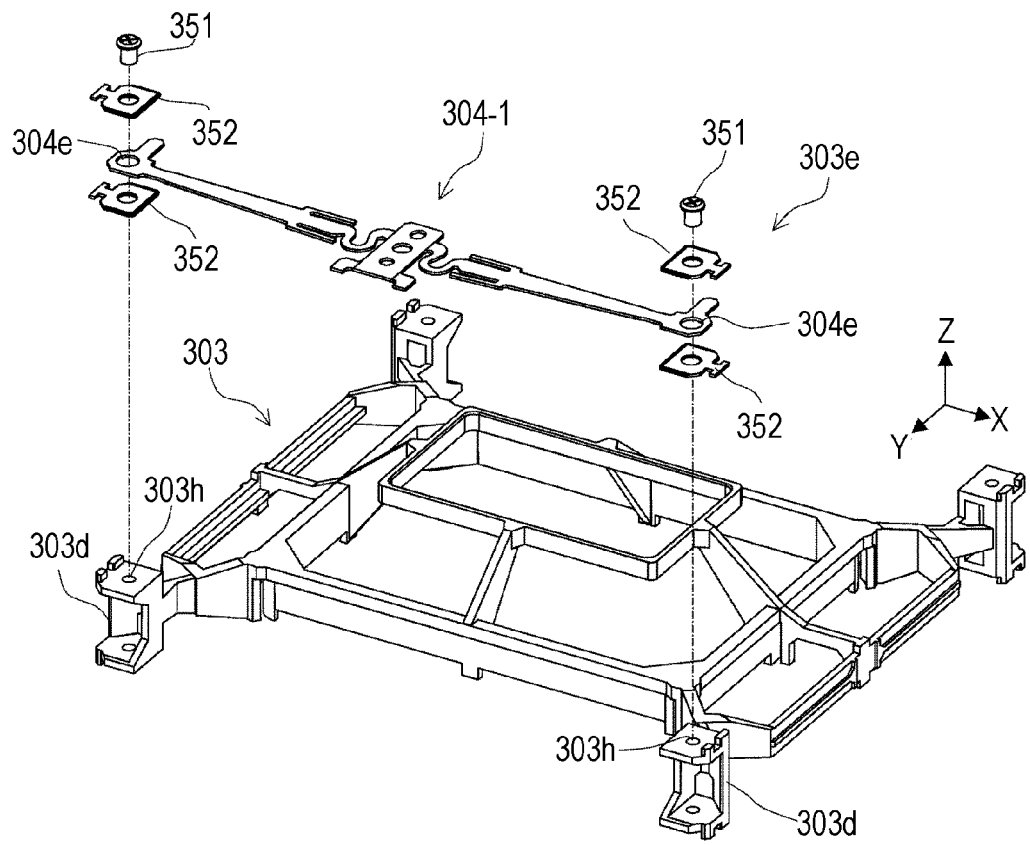
Figure 9B:
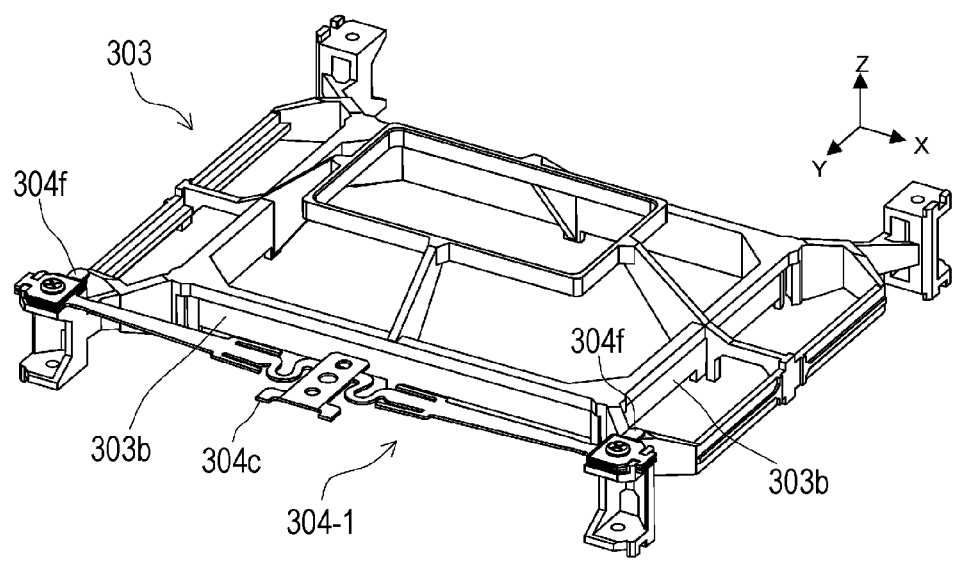
Figure 10A:
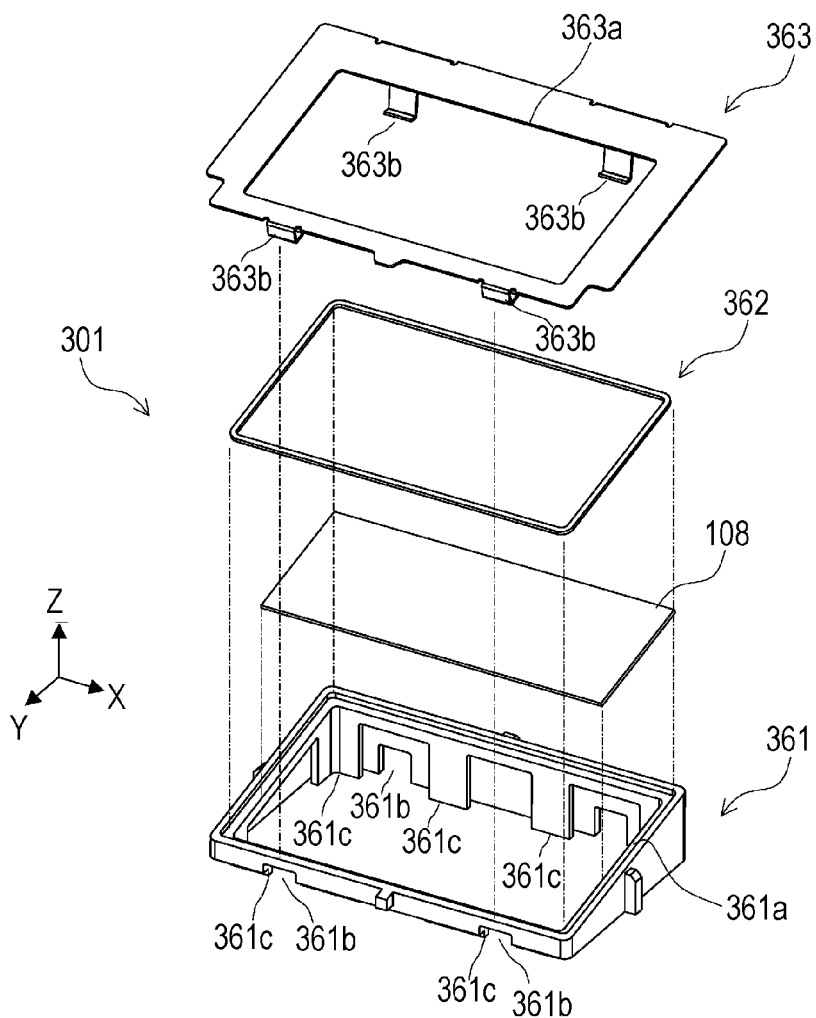
Figure 10B:
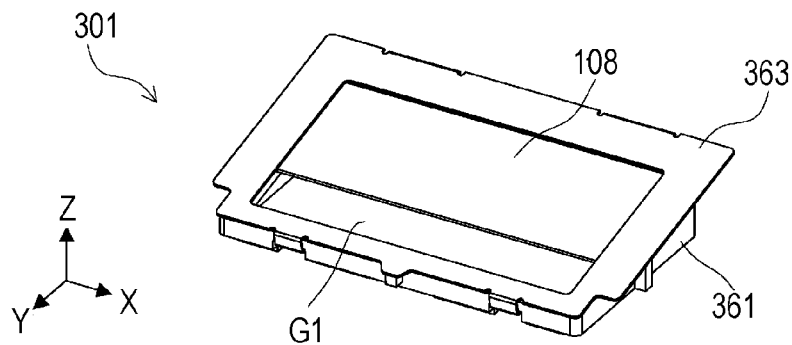
Figure 11A:
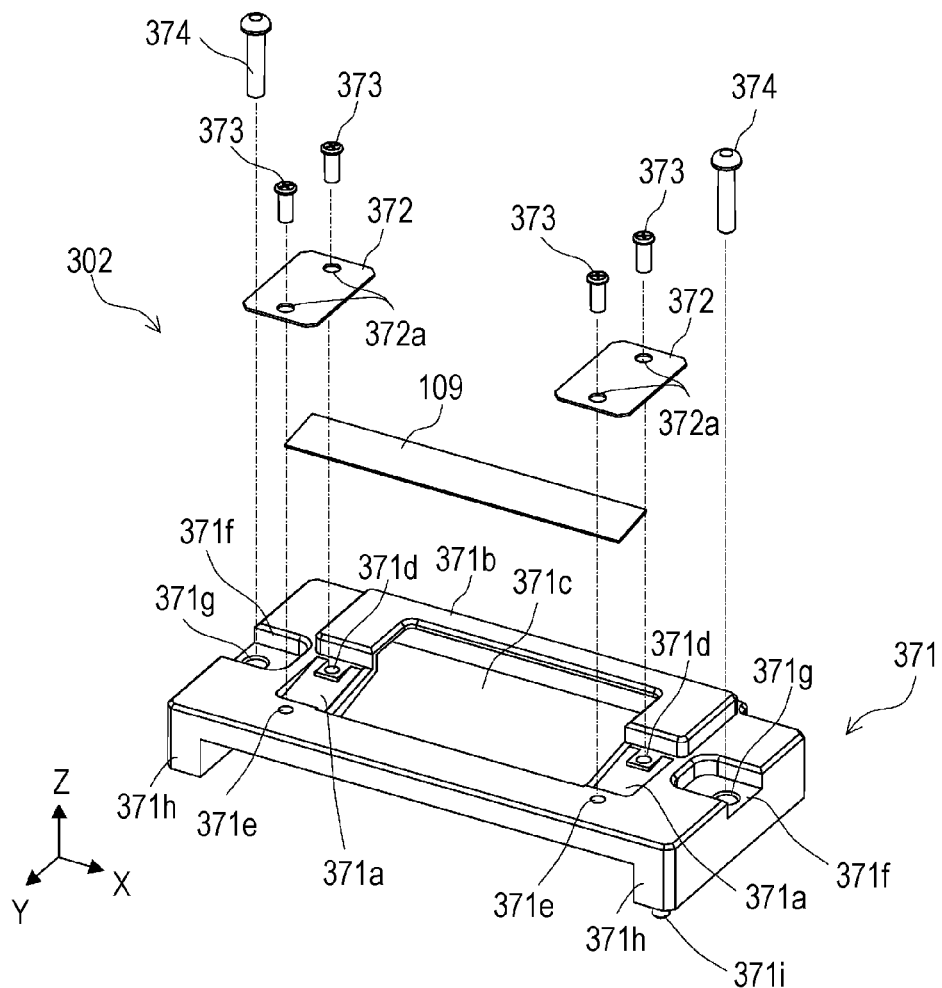
Figure 11B:
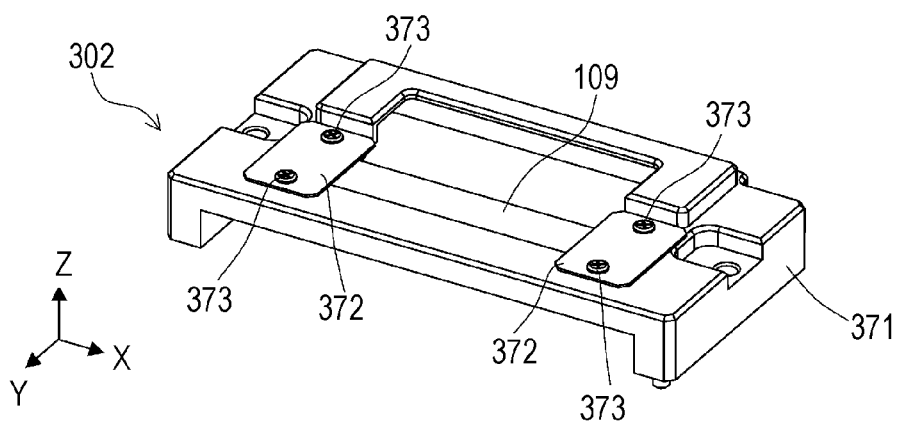
Figure 13A:
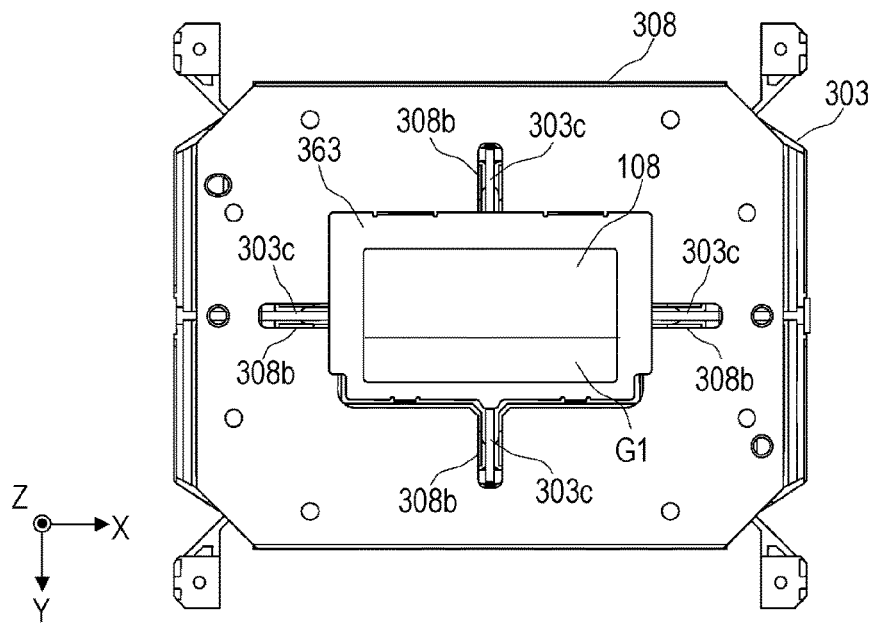
Figure 13B:
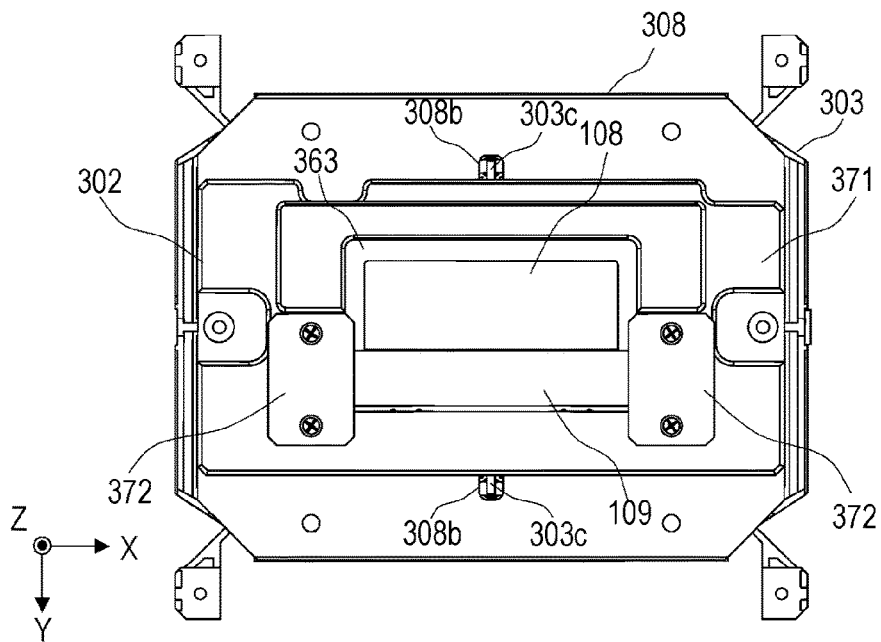
Figure 14A:
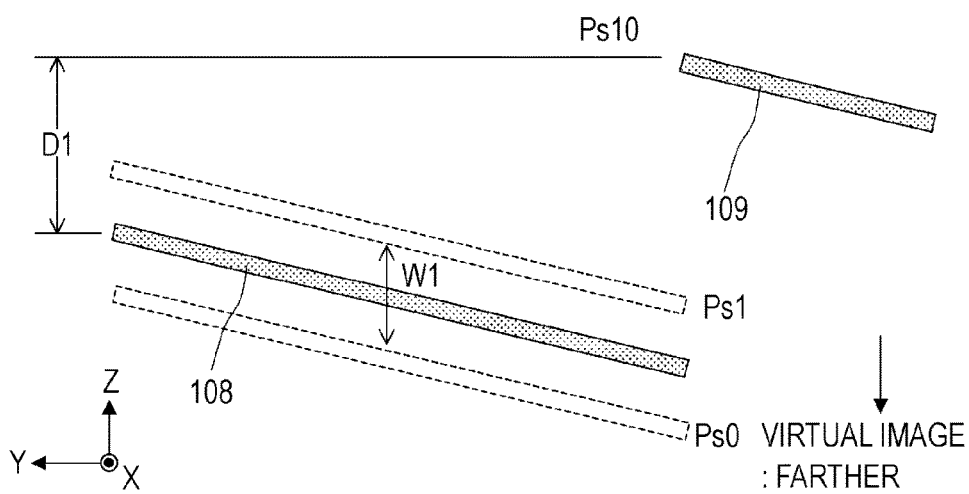
Figure 14B:
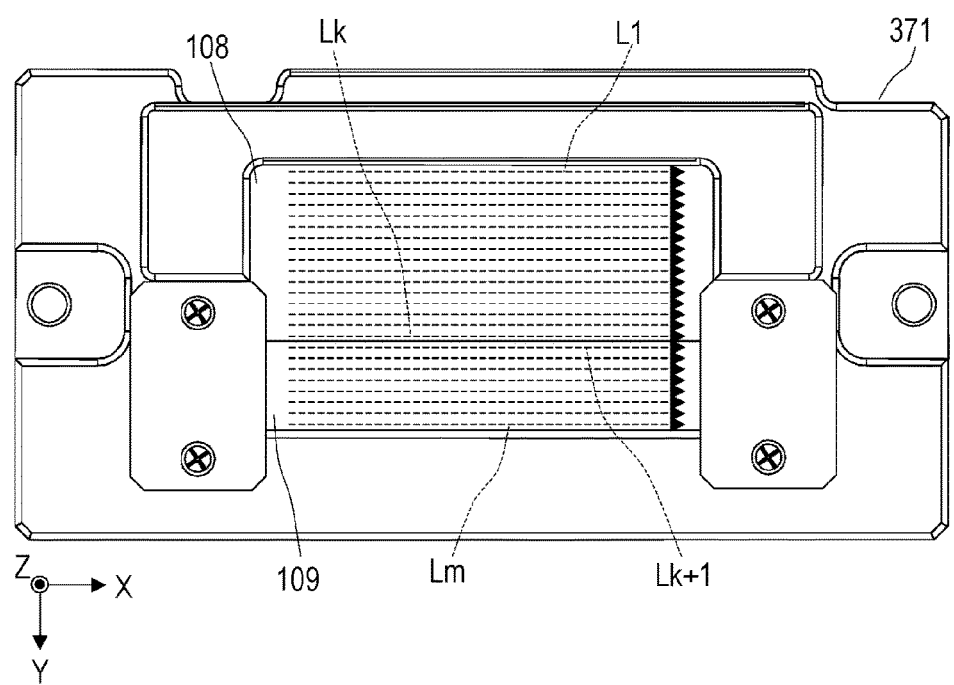
Figure 15A:
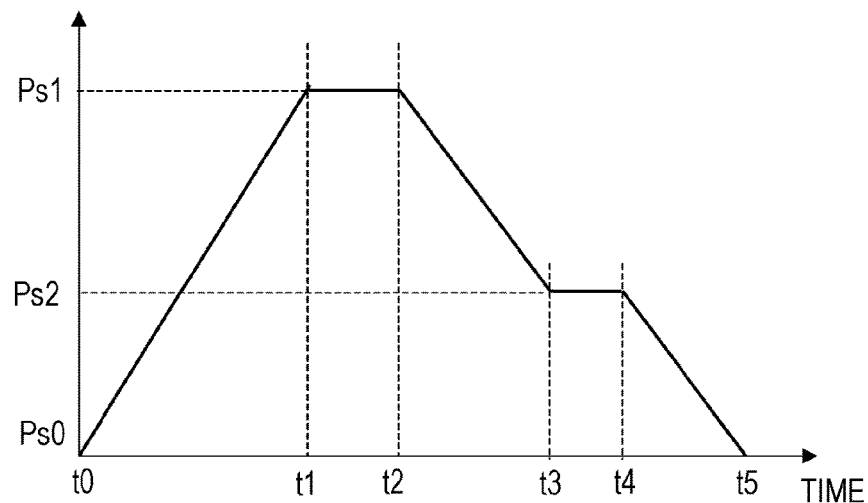
Figure 15B:
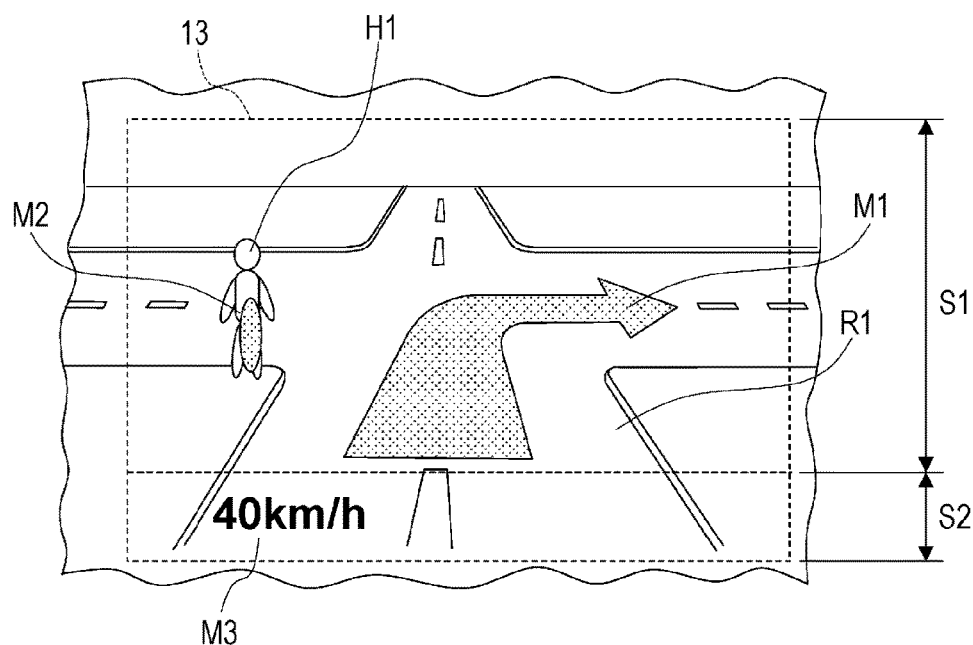
Figure 16:
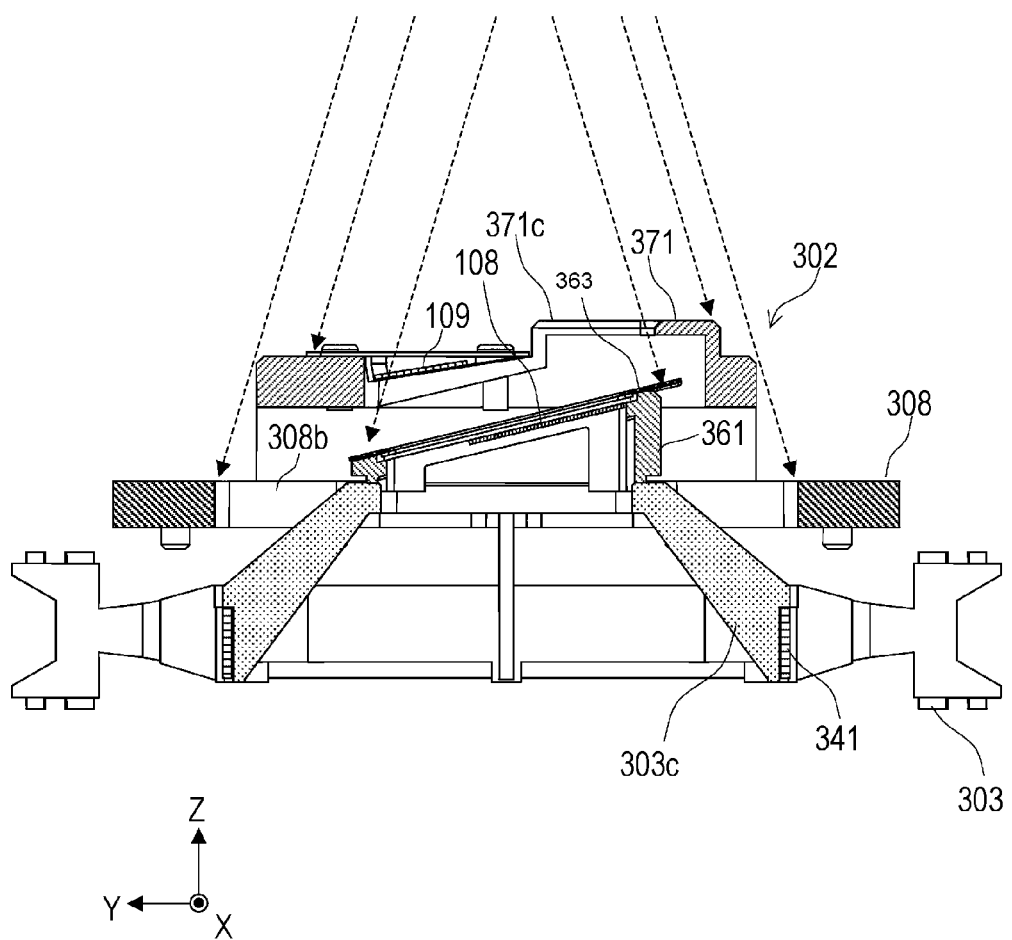

FIG. GB is a perspective view illustrating the configuration of the magnetic circuit according to the exemplary embodiment;

FIG. 7 is an exploded perspective view illustrating an assembly step of the support base and a fixing base according to the exemplary embodiment;

FIG. 8A is a perspective view illustrating a configuration of a support member and suspensions according to the exemplary embodiment, with the support member and the suspensions assembled;

FIG. 8B is a plan view illustrating a configuration of one of the suspensions according to the exemplary embodiment;

FIG. 8C is a plan view illustrating a configuration of the other suspension according to the exemplary embodiment;

FIG. 9A is an exploded perspective view illustrating an attachment structure of one of the suspensions to the support member according to the exemplary embodiment;

FIG. 9B is an exploded perspective view illustrating the attachment structure of one of the suspensions to the support member according to the exemplary embodiment;

FIG. 10A is an exploded perspective view illustrating a configuration of the structure body that supports the movable screen according to the exemplary embodiment;

FIG. 10B is a perspective view of an assembled body illustrating the configuration of the structure body that supports the movable screen according to the exemplary embodiment;

FIG. 11A is an exploded perspective view illustrating a configuration of the structure body that supports the fixed screen according to the exemplary embodiment;

FIG. 11B is a perspective view of an assembled body illustrating the configuration of the structure body that supports the fixed screen according to the exemplary embodiment;

FIG. 12A is a plan view illustrating a configuration of a holder that supports the fixed screen according to the exemplary embodiment;

FIG. 12B is a plan view illustrating the configuration of the holder according to the exemplary embodiment, with the fixed screen installed on the holder;

FIG. 13A is a plan view illustrating a configuration around a periphery of the magnetic cover according to the exemplary embodiment, before the structure body that supports the fixed screen is installed on the magnetic cover;

FIG. 13B is a plan view illustrating the configuration around the periphery of the magnetic cover according to the exemplary embodiment, with the structure body that supports the fixed screen installed on the magnetic cover;

FIG. 14A is a diagram schematically illustrating a positional relationship between the movable screen and the fixed screen according to the exemplary embodiment;

FIG. 14B is a diagram schematically illustrating a scanning method of the laser beam with respect to the movable screen and the fixed screen according to the exemplary embodiment;

FIG. 15A is a graph illustrating an example of driving the movable screen according to the exemplary embodiment;

FIG. 15B is a diagram schematically illustrating an example of image display according to the exemplary embodiment; and FIG. 16 is a cross-sectional view illustrating how stray light is incident according to the exemplary embodiment.

DETAILED DESCRIPTION

Hereinafter, an exemplary embodiment of the present disclosure will be described with reference to the accompanying drawings. X, Y, and Z-axes perpendicular to one another are added to each of the drawings. The present exemplary embodiment corresponds to an on-vehicle head-up display to which the present disclosure is applied.

Note that, in the following exemplary embodiment, structure body 302 corresponds to a "fixed support part" described in the appended claims, magnetic cover 308 corresponds to a "cover" described in the appended claims, and structure body 301 and support member 303 each correspond to a "movable part" described in the appended claims. However, such correspondences are not intended to impose limitations on significances of the respective terms described in the appended claims.

Figure 1A:
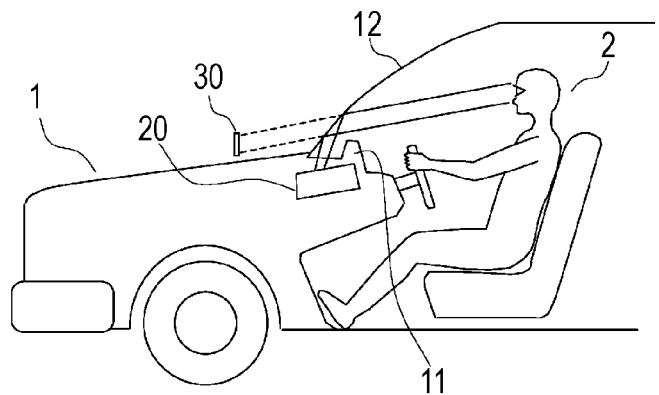
FIG. 1A is a diagram schematically illustrating a usage form of an image display device according to an exemplary embodiment.
Figure 1B:
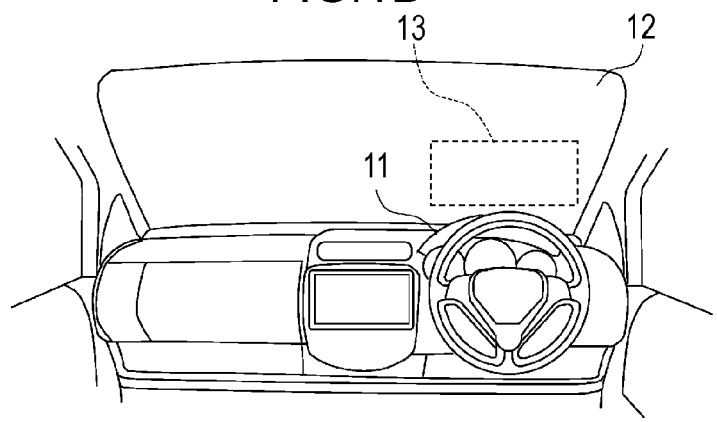
FIG. 1B is a diagram schematically illustrating the usage form of the image display device according to the exemplary embodiment.

FIG. 1A and FIG. 1B are diagrams each schematically illustrating a usage form of image display device 20. FIG. 1A is a diagram schematically illustrating, in a see-through manner, an inside of passenger vehicle 1 as viewed from a side of passenger vehicle 1, and FIG. 1B is a view of a front of passenger vehicle 1 in a driving direction as seen from the inside of passenger vehicle 1.

As illustrated in FIG. 1A, image display device 20 is installed inside dashboard 11 of passenger vehicle 1.

As illustrated in FIG. 1A and FIG. 1B, image display device 20 projects laser light, which is modulated based on a video signal, onto projection region 13 near a driver's seat on a lower side of windshield 12. The laser light is reflected by projection region 13, and is applied to an oblong region (eyebox region) around eyes of driver 2. This causes predetermined image 30 to be displayed as a virtual image in a viewing field in front of driver 2. Therefore, driver 2 can view image 30, which is the virtual image, superimposed on a scene in front of windshield 12. In other words, image display device 20 forms image 30, which is the virtual image, in a space in front of projection region 13 of windshield 12.

Figure 1C:
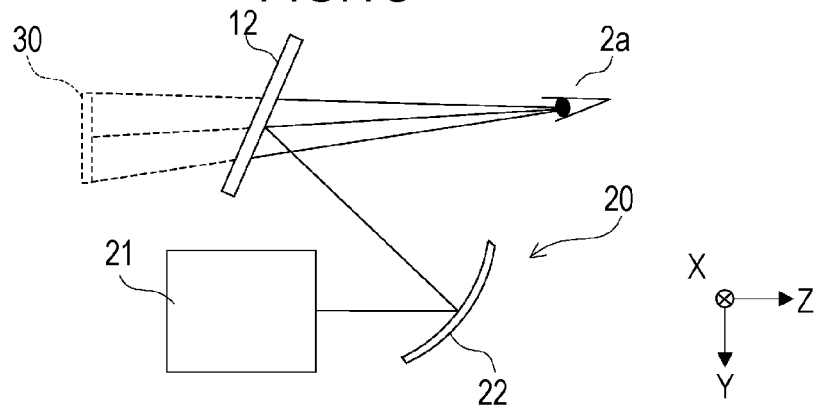
FIG. 1C is a diagram schematically illustrating a configuration of the image display device according to the exemplary embodiment.

FIG. 1C is a diagram schematically illustrating a configuration of image display device 20.

Image display device 20 includes irradiation light generator 21 and mirror 22. Irradiation light generator 21 emits light modulated based on the video signal. Mirror 22 has a curved reflecting surface and reflects, toward windshield 12, the light emitted from irradiation light generator 21. The light reflected by windshield 12 is applied to eye 2a of driver 2. An optical system of irradiation light generator 21 and mirror 22 are designed such that image 30 as the virtual image can be displayed in a predetermined size in front of windshield 12.

Mirror 22 constitutes an optical system that uses light from movable screen 108 and fixed screen 109 (described later) to generate the virtual image. This optical system does not necessarily have to be constituted only of mirror 22. For example, this optical system may include a plurality of mirrors, and may include a lens or other components.

Figure 2:
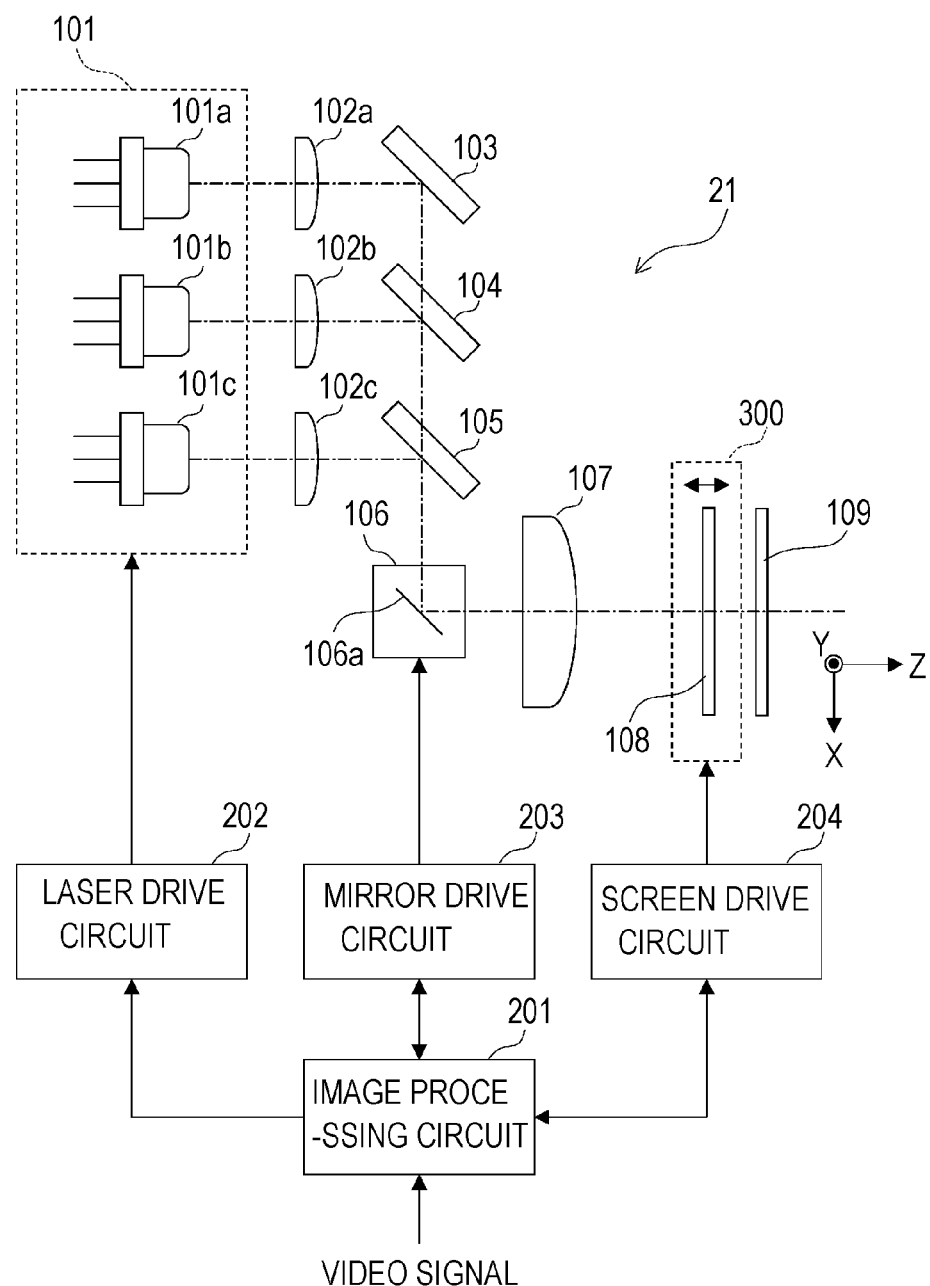
FIG. 2 is a block diagram of an irradiation light generator and circuits used in the irradiation light generator of the image display device according to the exemplary embodiment.

FIG. 2 is a diagram illustrating configurations of irradiation light generator 21 of image display device 20 and of circuits used in irradiation light generator 21.

Irradiation light generator 21 includes light source 101, collimator lenses 102a to 102c, mirror 103, dichroic mirrors 104, 105, scanning unit 106, correction lens 107, movable screen 108, fixed screen 109, and drive unit 300.

Light source 101 includes three laser light sources 101a to 101c. Laser light sources 101a to 101c respectively emit laser light in a red wavelength band, laser light in a green wavelength band, and laser light in a blue wavelength band. In the present exemplary embodiment, in order to display a color image as image 30, light source 101 includes three laser light sources 101a to 101c. In a case where a monochrome image is displayed as image 30, light source 101 may include only one laser light source corresponding to a color of the image. Laser light sources 101a to 101c are, for example, semiconductor lasers.

Laser beams emitted from laser light sources 101a to 101c are respectively converted into substantially parallel light by collimator lenses 102a to 102c. At this time, the laser beam emitted from each of laser light sources 101a to 101c is shaped into a circular beam shape by an aperture (not illustrated). Note that, in place of collimator lenses 102a to 102c, shaping lenses may be used, each of which shapes the laser beam into a circular beam shape and collimates the laser beam. In such a case, the aperture can be omitted.

Then, with regard to the laser beams of the respective colors emitted from laser light sources 101a to 101c, their respective optical axes are aligned with one another by mirror 103 and two dichroic mirrors 104, 105. Mirror 103 substantially totally reflects the red laser beam transmitted through collimator lens 102a. Dichroic mirror 104 reflects the green laser beam transmitted through collimator lens 102b, and transmits the red laser beam reflected by mirror 103. Dichroic mirror 105 reflects the blue laser beam transmitted through collimator lens 102c, and transmits the red laser beam that has passed through dichroic mirror 104 and the green laser beam that has reflected by dichroic mirror 104. Mirror 103 and two dichroic mirrors 104, 105 are disposed so as to align the optical axes of the laser beams of the respective colors with one another, the laser beams being emitted from laser light sources 101a to 101c.

Scanning unit 106 reflects the laser beams of the respective colors that have passed through or reflected by dichroic mirror 105. Scanning unit 106 is comprised of, for example, a micro electro mechanical system (MEMS) mirror and is configured to rotate mirror 106a, onto which the laser beams of the respective colors having passed through dichroic mirror 105 are made incident, about an axis parallel to the Y-axis and an axis perpendicular to the Y-axis in response to a drive signal. The rotation of mirror 106a changes a reflection direction of the laser beam in an in-plane direction of an X-Z plane and in an in-plane direction of a Y-Z plane. In this way, as will be described later, movable screen 108 and fixed screen 109 are scanned with the laser beams of the respective colors.

Note that, although scanning unit 106 is comprised of such a two-axis driving MEMS mirror herein, scanning unit 106 may have another configuration. For example, scanning unit 106 may be comprised of a combination of a mirror that is rotationally driven about the axis parallel to the Y-axis and a mirror that is rotationally driven about the axis perpendicular to the Y-axis.

Correction lens 107 is designed to direct the laser beams of the respective colors in a positive direction of the Z-axis regardless of a swing angle of the laser beams deflected by scanning unit 106. Movable screen 108 and fixed screen 109 are scanned with the laser beams to form an image, and diffuses the incident laser beams to a region (eyebox region) around eye 2a of driver 2. Movable screen 108 and fixed screen 109 are each made of a transparent resin such as polyethylene terephthalate (PET).

Movable screen 108 is used to display a depth image whose visual distance varies in a depth direction, and fixed screen 109 is used to display a fixed image whose visual distance is constant. For example, an arrow for guiding a vehicle in a traveling direction is displayed as the depth image, and characters indicating a vehicle speed or an outside air temperature are displayed as the fixed image.

Drive unit 300 drives movable screen 108 to reciprocate in a direction (Z-axis direction) parallel to a traveling direction of the laser beams. A configuration of drive unit 300 will be described later with reference to FIG. 4A to FIG. 13B.

Image processing circuit 201 includes an arithmetic processing unit such as a central processing unit (CPU) and a memory. Image processing circuit 201 processes a video signal, which is input thereto, and controls laser drive circuit 202, mirror drive circuit 203, and screen drive circuit 204. Laser drive circuit 202 changes emission intensity of laser light sources 101a to 101c in response to a control signal from image processing circuit 201. Mirror drive circuit 203 drives mirror 106a of scanning unit 106 in response to a control signal from image processing circuit 201. Screen drive circuit 204 drives movable screen 108 in response to a control signal from image processing circuit 201. Control in image processing circuit 201 during an image display operation will be described later with reference to FIG. 14A.

Figure 3A:
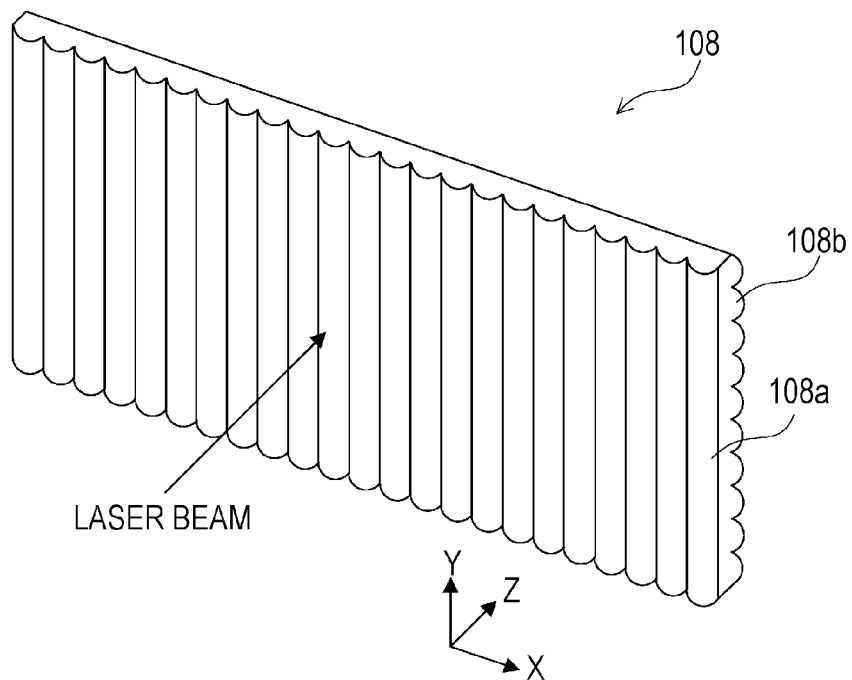
FIG. 3A is a perspective view schematically illustrating a configuration of a screen according to the exemplary embodiment.
Figure 3B:
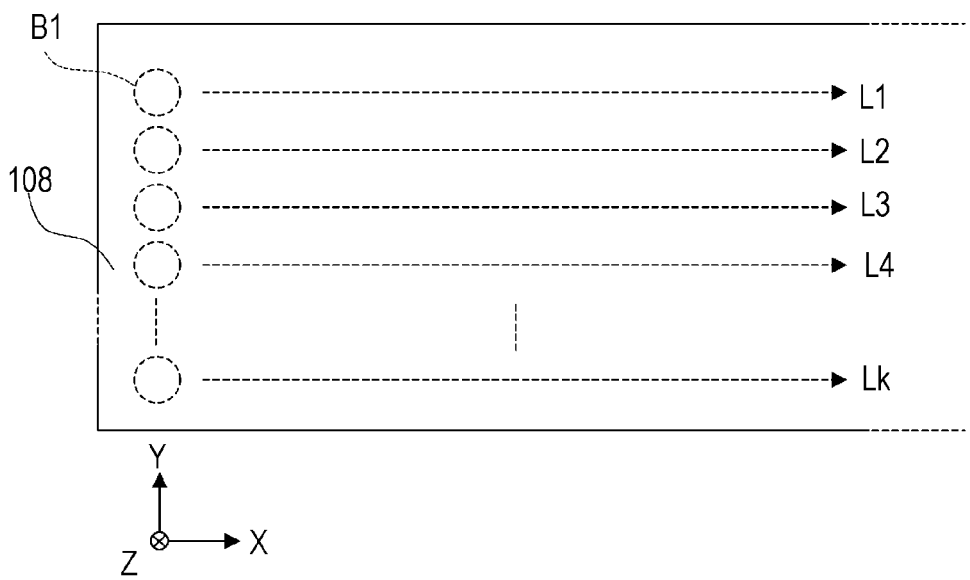
FIG. 3B is a diagram schematically illustrating a scanning method of a laser beam with respect to the screen according to the exemplary embodiment.

FIG. 3A is a perspective view schematically illustrating a configuration of movable screen 108. FIG. 3B is a diagram schematically illustrating a scanning method of laser beam with respect to movable screen 108.

As illustrated in FIG. 3A, a plurality of first lens portions 108a for diverging laser light in the X-axis direction are formed on a laser beam incident surface of movable screen 108 (that is, a surface on a negative side of the Z-axis) so as to be arrayed in the X-axis direction. A shape of each of first lens portions 108a as viewed in the Y-axis direction is a substantially circular arc shape. A width in the X-axis direction of each of first lens portions 108a is, for example, 50 μm.

Furthermore, a plurality of second lens portions 108b for diverging the laser beam in the Y-axis direction are formed on a laser beam emission surface of movable screen 108 (that is, a surface on a positive side of the Z-axis) so as to be arrayed in the Y-axis direction. A shape of each of second lens portions 108b as viewed in the X-axis direction is a substantially circular arc shape. A width in the Y-axis direction of each of second lens portions 108b is, for example, 70 μm.

The light incident surface (the surface on the negative side of the Z-axis) of movable screen 108 having the above-described configuration is scanned, as illustrated in FIG. 3B, in the positive direction of the X-axis with beam B1 composed of the laser beams of the respective colors that have been superimposed on one another. On the light incident surface of movable screen 108, scan lines L1 to Lk through which beam B1 passes are set beforehand at constant intervals in the Y-axis direction. Start positions of scan lines L1 to Lk coincide with one another in the X-axis direction, and end positions of scan lines L1 to Lk coincide with one another in the X-axis direction. A diameter of beam B1 is set to approximately 50 μm, for example.

Scan lines L1 to Lk are scanned by high frequency beam B1 composed of the laser beams of the respective colors that have been modulated based on the video signal, thereby forming an image. The image thus formed is projected onto the region (eyebox region) around eye 2a of driver 2 via movable screen 108, mirror 22, and windshield 12 (refer to FIG. 1C). This allows driver 2 to visually recognize image 30 as a virtual image in a space in front of windshield 12.

Fixed screen 109 has a configuration similar to that of movable screen 108. Fixed screen 109 is smaller in width than movable screen 108 in the Y-axis direction. Fixed screen 109 is scanned with beam B1 in the X-axis direction, similar to movable screen 108. A number of scan lines on fixed screen 109 is smaller than a number of scan lines on movable screen 108.

In the present exemplary embodiment, only movable screen 108 is driven by drive unit 300, and fixed screen 109 is fixed at a predetermined position. In order to display the depth image, movable screen 108 is scanned with beam B1 while being moved in an optical axis direction (Z-axis direction). In order to display the fixed image, fixed screen 109 fixed at the predetermined position is scanned with beam B1.

Next, a configuration of drive unit 300 will be described.

Figure 4A:
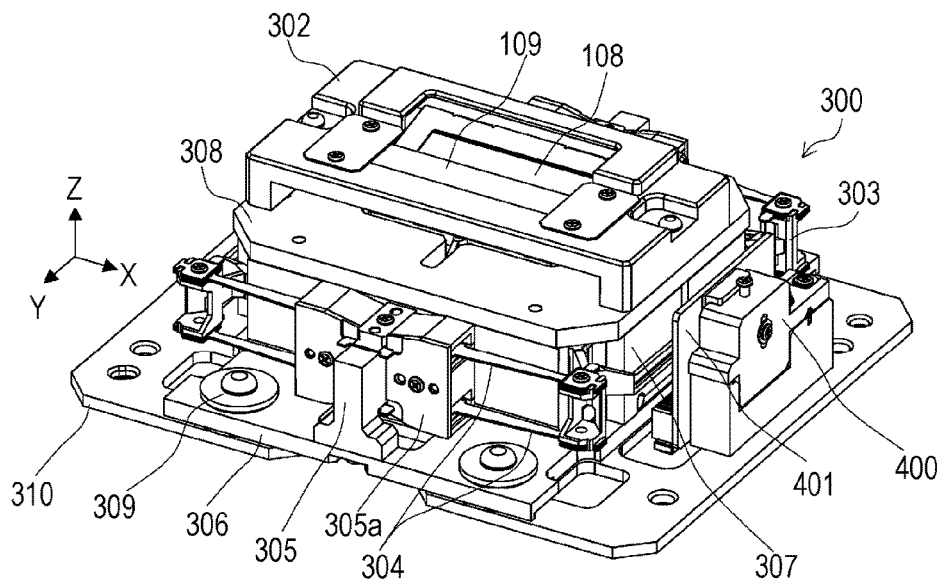
FIG. 4A is a perspective view illustrating a configuration of a drive unit according to the exemplary embodiment, with a structure body that supports a fixed screen installed on the drive unit.
Figure 4B:
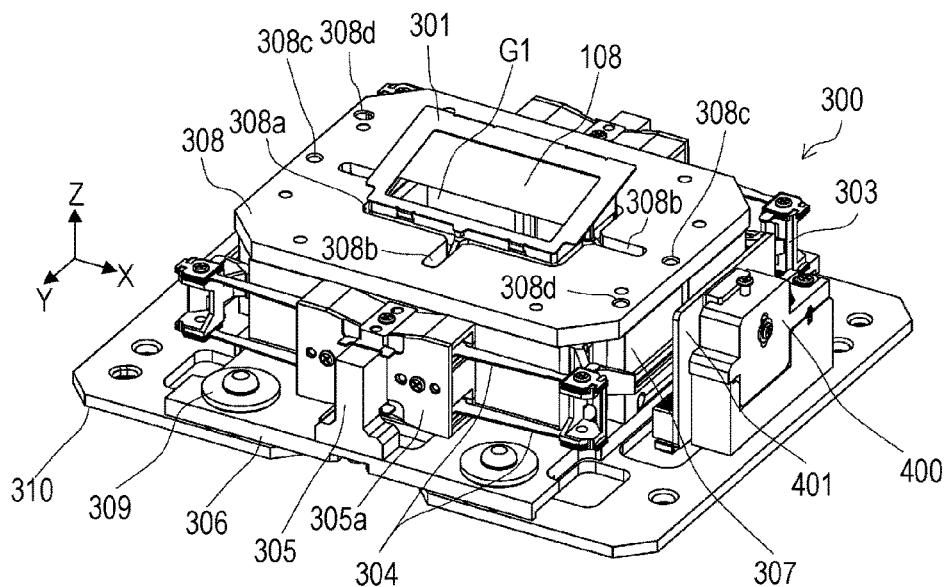
FIG. 4B is a perspective view illustrating the configuration of the drive unit according to the exemplary embodiment.
Figure 5A:
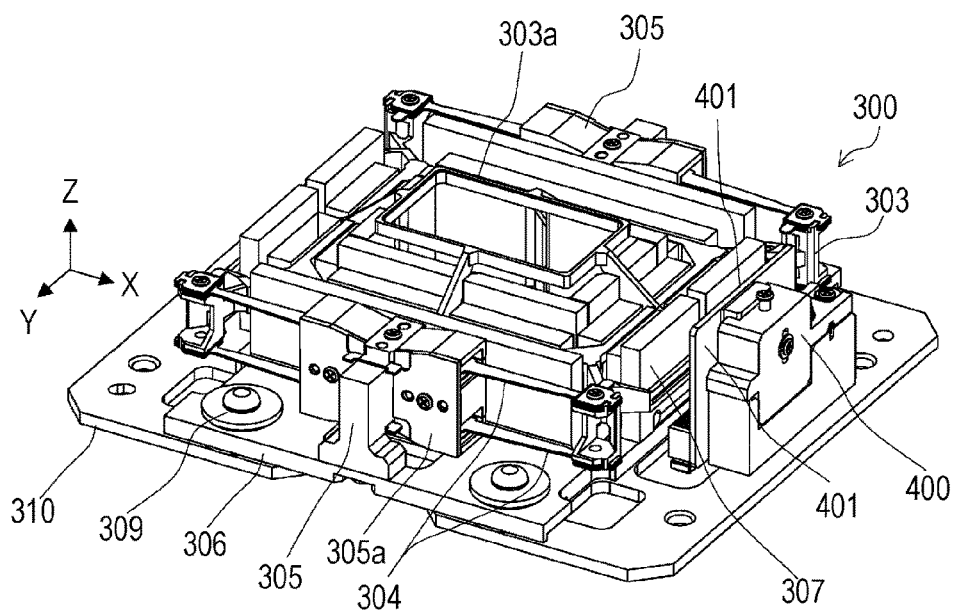
FIG. 5A is a perspective view illustrating the configuration of the drive unit according to the exemplary embodiment, with a structure body that supports a movable screen, the structure body that supports the fixed screen, and a magnetic cover removed from the drive unit.

FIG. 4A is a perspective view illustrating the configuration of drive unit 300 with structure body 302 that supports fixed screen 109 installed thereon, and FIG. 4B is a perspective view illustrating the configuration of drive unit 300. FIG. 5A is a perspective view illustrating the configuration of drive unit 300 with magnetic cover 308 and structure body 301 that supports movable screen 108 removed therefrom. Note that FIG. 4A, FIG. 4B, and FIG. 5A illustrate drive unit 300 supported by support base 306 and fixing base 310.

Note that in the following, the configuration will be described, defining directions by X, Y, and Z-axes, and in addition, assuming that a side closer to a center of drive unit 300 and a side farther from the center of drive unit 300 in a plan view are respectively referred to as an inner side and an outer side, for the sake of convenience.

In FIG. 4A and FIG. 4B, movable screen 108 and fixed screen 109 are installed on structure body 301 and structure body 302, respectively, so as to be sloped in the same direction. Movable screen 108 and fixed screen 109 are installed at positions that are aligned in a direction (Y-axis direction) perpendicular to a movement direction (Z-axis direction) in which movable screen 108 is moved by drive unit 300 and that are shifted from each other by a predetermined distance in the movement direction (Z-axis direction). Structure body 302 is installed on an upper surface of magnetic cover 308 to cover an area around opening 308a of magnetic cover 308.

As illustrated in FIG. 4B, gap G1 is formed adjacent to movable screen 108 on a positive side of the Y-axis. Fixed screen 109 is positioned directly above gap G1. Fixed screen 109 is scanned with the laser beam passing through gap G1.

Structure body 301 having movable screen 108 installed thereon is installed on inner frame 303a of support member 303 illustrated in FIG. 5A. Support member 303 is supported by two support units 305 that are aligned in the Y-axis direction so as to be movable in the Z-axis direction via four suspensions 304. Support units 305 are installed on support base 306. Each of support units 305 includes gel covers 305a on the positive side and the negative side of the X-axis, and gel covers 305a are filled with gel for damping.

In this way, movable screen 108 is supported, movably in the Z-axis direction, by support base 306 via structure body 301, support member 303, suspensions 304, and support units 305. Configurations of support member 303 and suspensions 304 will be described later with reference to FIG. 8A to FIG. 8C. Furthermore, a configuration of support base 306 will be described later with reference to FIG. 5B.

On support base 306, magnetic circuit 307 is further installed. Magnetic circuit 307 is configured to apply a magnetic field to coil 341 (refer to FIG. 8A) mounted on support member 303. When a drive signal (current) is applied to coil 341, electromagnetic force in the Z-axis direction is generated in coil 341. The electromagnetic force thus generated drives support member 303 together with coil 341 in the Z-axis direction. This causes movable screen 108 to move in the Z-axis direction. A configuration of magnetic circuit 307 will be described later with reference to FIG. 6A and FIG. 6B.

Magnetic cover 308 is put on an upper surface of magnetic circuit 307. Magnetic cover 308 is made of a magnetic material and functions as a yoke of magnetic circuit 307. When magnetic cover 308 is put on the upper surface of magnetic circuit 307, magnetic cover 308 is attracted to magnetic circuit 307. Magnetic cover 308 is thus installed on drive unit 300.

As illustrated in FIG. 4B, magnetic cover 308 is provided with opening 308a through which structure body 301 passes. Furthermore, cutouts 308b are formed extending outward from opening 308a. Cutouts 308b are configured to allow beam 303c (refer to FIG. 8A) of support member 303 (described later) to pass therethrough. Magnetic cover 308 is further provided with two threaded holes 308c used for fastening structure body 302 to magnetic cover 308 with screws and two holes 308d used for positioning structure body 302.

Support base 306 is installed on fixing base 310 via damper units 309. Damper units 309 support support base 306 while keeping support base 306 in suspension in the positive direction of the Z-axis with respect to fixed base 310. Damper units 309 absorb vibration generated in association with the driving of support member 303 before the vibration is transmitted from support base 306 to fixing base 310. Configurations of damper units 309 and fixing base 310 will be described later with reference to FIG. 7.

On fixing base 310, position detection unit 400 is further installed. Position detection unit 400 includes printed circuit board 401 facing a side surface of support member 303 on the positive side of the X-axis. An encoder (not illustrated) is disposed on a surface of printed circuit board 401 on the negative side of the X-axis. This encoder detects a position of support member 303 in the Z-axis direction. A method for detecting the position of support member 303 with the encoder will be described later with reference to FIG. 8A.

Figure 5B:
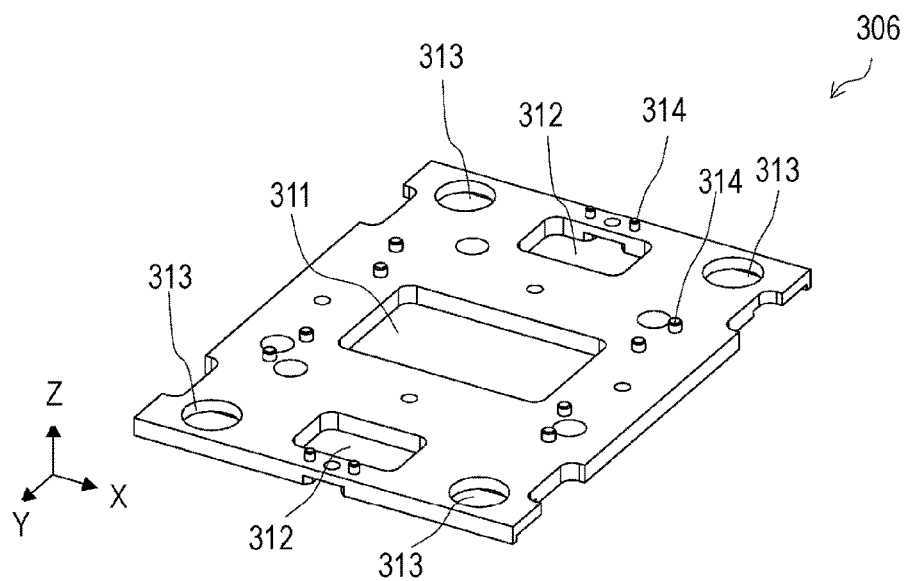
FIG. 5B is a perspective view illustrating a configuration of a support base according to the exemplary embodiment.

FIG. 5B is a perspective view illustrating a configuration of support base 306 as viewed from the positive side of the Z-axis.

As illustrated in FIG. 5B, support base 306 has an approximately rectangular shape in a plan view. Support base 306 is made of a highly rigid metal material. At a center of support base 306, opening 311 is formed to allow laser light to pass therethrough. Furthermore, at each of four corners of support base 306, circular hole 313 is formed for installing each of damper units 309.

Moreover, at a central position in the X-axis direction in each of ends of support base 306 on the positive side and a negative side of the Y-axis, opening 312 is formed for installing each of support units 305. In addition, on an upper surface (a surface on the positive side of the Z-axis) of support base 306, a plurality of bosses 314 for positioning magnetic circuit 307 and support units 305 are formed.

Figure 6A:
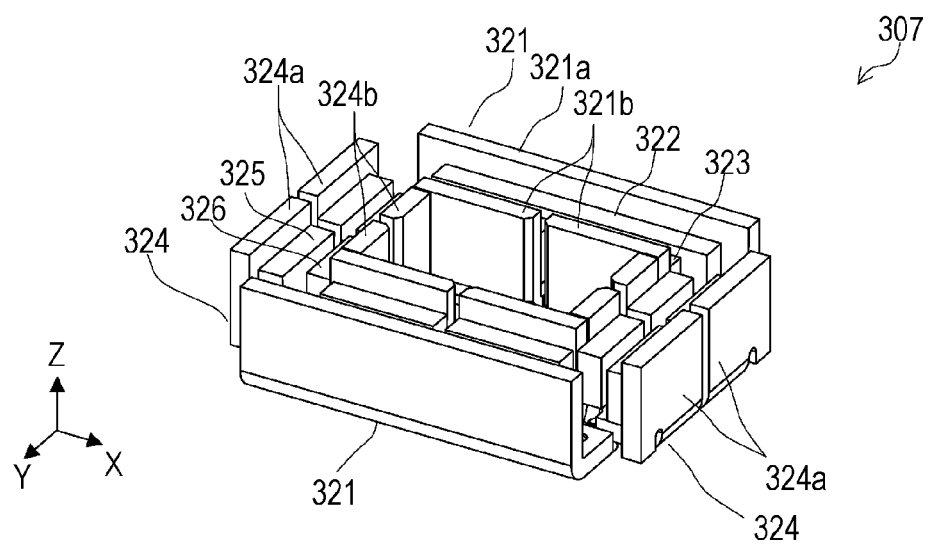
FIG. 6A is a perspective view illustrating a configuration of a magnetic circuit according to the exemplary embodiment.
Figure 6B:
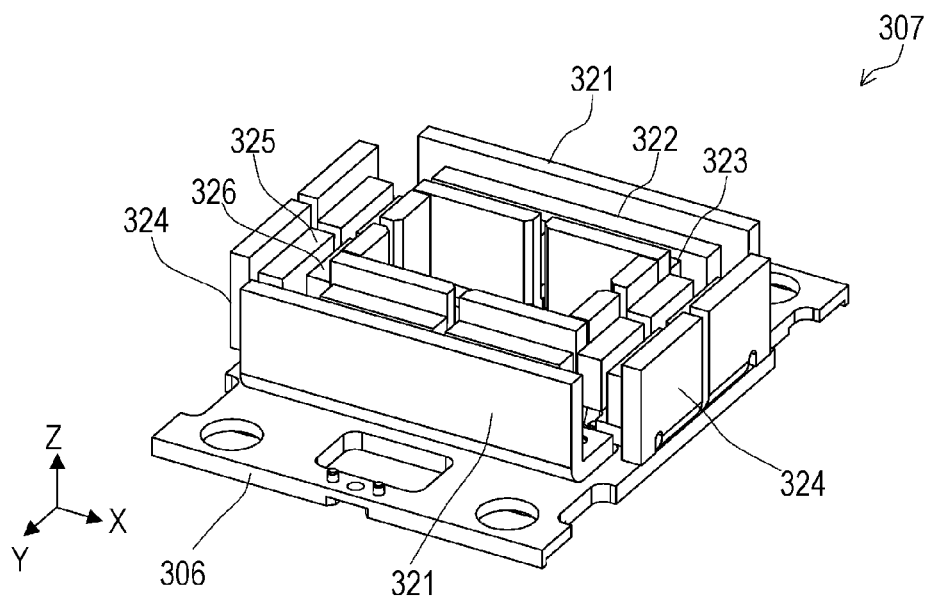

FIG. 6A and FIG. 6B are perspective views each illustrating a configuration of magnetic circuit 307.

Magnetic circuit 307 includes two yokes 321 aligned in the Y-axis direction. Yokes 321 have a U-shape as viewed in the X-axis direction. Each of two yokes 321 has two separated inner walls 321b. On an inner side of outer wall 321a of each of yokes 321, magnet 322 is installed. Furthermore, on an outer side of each of two walls 321b located on an inner side of each of yokes 321, magnet 323 is installed so as to face magnet 322. Between magnet 322 and magnets 323 facing each other, a gap is formed into which coil 341 (refer to FIG. 8A) to be described later is inserted.

Magnetic circuit 307 further includes two yokes 324 aligned in the X-axis direction. Yokes 324 have a U-shape as viewed in the Y-axis direction. Each of two yokes 324 has two separated outer walls 324a and two separated inner walls 324b. On an inner side of each of two walls 324a located on an outer side of each of yokes 324, magnet 325 is installed. Furthermore, on an outer side of each of two walls 324b located on an inner side of each of yokes 324, magnet 326 is installed so as to face corresponding magnet 325. Between magnets 325 and magnets 326 facing each other, a gap is formed into which coil 341 (refer to FIG. 8A) to be described later is inserted. An end of each of magnets 326 in the Y-axis direction overlaps a side surface of inner wall 321b of adjacent yoke 321.

In each of lower surfaces of two yokes 321 and each of lower surfaces of two yokes 324, holes (not illustrated) are formed at positions into which bosses 314 of support base 306 illustrated in FIG. 5B are fitted. Yokes 321, 324 are installed on an upper surface of support base 306 such that bosses 314 are fitted into the holes formed in the lower surfaces of yokes 321, 324. As illustrated in FIG. 6B, magnetic circuit 307 is thus installed on the upper surface of support base 306.

FIG. 7 is an exploded perspective view illustrating an assembly step of support base 306 and fixing base 310.

As illustrated in FIG. 7, each of damper units 309 includes damper 309a, washer 309b, and screw 309c. Fixing base 310 includes: opening 331 through which laser light passes; threaded holes 332 for receiving screws 309c; opening 333 for installing position detection unit 400; and bosses 334 for positioning position detection unit 400. Fixing base 310 is integrally formed of a highly rigid metal material.

Dampers 309a are each integrally formed of a material that has an excellent damping property. Dampers 309a are each formed of, for example, a material with high viscous damping such as αGEL (registered trademark) or rubber. A sleeve of a cylindrical shape is fitted into a hole formed at a center of each of dampers 309a. Each of dampers 309a is fitted into hole 313 formed at each of four corners of support base 306. In this state, washers 309b are put on the upper surfaces of dampers 309a. Further, screws 309c are inserted through washers 309b and screwed in threaded holes 332 of fixing base 310. This causes support base 306 to be supported by fixing base 310 via dampers 309a.

FIG. 8A is a perspective view illustrating a configuration of support member 303 and suspensions 304 with support member 303 and suspensions 304 assembled.

As illustrated in FIG. 8A, support member 303 has a frame shape. Support member 303 is formed of a lightweight and highly rigid material. In the present exemplary embodiment, support member 303 is formed of a liquid crystal polymer in which a carbon filler is mixed. Support member 303 includes inner frame 303a and outer frame 303b both having an approximately rectangular shape in a plan view. Inner frame 303a and outer frame 303b are connected to each other with four beams 303c such that a center of inner frame 303a and a center of outer frame 303b coincide with each other in a plan view. Inner frame 303a is in a position shifted upward (the positive direction of the Z-axis) from outer frame 303b.

Structure body 301 is installed on an upper surface of inner frame 303a. Furthermore, coil 341 is mounted on a lower surface of outer frame 303b. Coil 341 extends along the lower surface of outer frame 303b so as to have a rectangular shape with round corners.

At each of four corners of outer frame 303b, connection part 303d is formed extending radially. Each of connection parts 303d has an upper flange and a lower flange. To an upper surface of the upper flange of each of connection parts 303d, an end of upper suspension 304 is fixed with fixing member 303e. Furthermore, to a lower surface of the lower flange of each of connection parts 303d, an end of lower suspension 304 is fixed with fixing member 303e. This causes suspensions 304 to be mounted on support member 303.

Support member 303 further includes bridges 303f each connecting connection parts 303d that are neighboring to each other in the Y-axis direction. A part of each bridge 303f except both ends in the Y-axis direction extends parallel to the Y-axis direction, and at a center of the part, installing surface 303g parallel to a Y-Z plane is provided. A scale is installed on installing surface 303g of bridge 303f, on the positive side of the X-axis, of support member 303.

Two suspensions 304 on the positive side of the Y-axis and two suspensions 304 on the negative side of the Y-axis are mounted on support units 305 as illustrated in FIG. 5A. This causes coil 341 mounted on the lower surface of outer frame 303b to be inserted into the gap between the mutually facing magnets of magnetic circuit 307 illustrated in FIG. 6B. Furthermore, the scale installed on installing surface 303g of bridge 303f, on the positive side of the X-axis, of support member 303 faces the encoder installed on printed circuit board 401 of position detection unit 400.

The encoder of position detection unit 400 includes an optical sensor that emits light to the scale and receives light reflected from the scale, and the optical sensor optically detects movement of the scale in the Z-axis direction. On the basis of a detection signal from the encoder, a position of support member 303 and movable screen 108 in the Z-axis direction is detected. On the basis of the detected position, driving of movable screen 108 is controlled.

Note that magnetic poles of magnets 322, 323, 325, 326 of magnetic circuit 307 illustrated in FIG. 6A and FIG. 6B are adjusted such that a drive signal (current) applied to coil 341 causes coil 341 to generate driving force in one direction parallel to the Z-axis direction.

FIG. 8B and FIG. 8C are plan views each illustrating a configuration of each of suspensions 304.

In the present exemplary embodiment, a shape of suspension 304 on an upper side (the positive side of the Z-axis) and a shape of suspension 304 on a lower side (the negative side of the Z-axis) illustrated in FIG. 8A are different from each other. Herein, suspension 304 on the upper side is referred to as suspension 304-1, and suspension 304 on the lower side is referred to as suspension 304-2, for the sake of convenience.

Suspensions 304-1, 304-2 are thin plate-shaped members and are each integrally formed of a conductive and flexible metal material. Suspensions 304-1, 304-2 are made of a beryllium copper alloy, for example. Suspensions 304-1, 304-2 each have a symmetrical shape with respect to a central position in the X-axis direction. Suspensions 304-1, 304-2 each have three holes 304a, at the central position in the X-axis direction, used for mounting suspension 304-1, 304-2 on support unit 305. Furthermore, suspensions 304-1, 304-2 each have flexible structures 304b of a crank shape on both sides of three holes 304a.

Moreover, suspensions 304-1, 304-2 each have a pair of flanges 304c protruding in the positive direction of the Y-axis. Furthermore, suspensions 304-1, 304-2 each have a pair of arms 304d extending in the X-axis direction, and have hole 304e at an end of each of arms 304d. Moreover, suspensions 304-1, 304-2 each have a pair of flanges 304f protruding from the respective ends of arms 304d in the negative direction of the Y-axis.

Moreover, suspensions 304-1, 304-2 each have a pair of hooks 304g on respective end sides of flexible structures 304b. When movable screen 108 is reciprocated in the Z-axis direction, suspensions 304-1, 304-2 are deformed into an S-shape in the Z-axis direction. Hooks 304g are disposed in each of suspensions 304-1, 304-2 so as to be positioned at respective inflection points of the deformations. As illustrated in FIG. 4A, hooks 304g are housed in gel covers 305a. Hooks 304g are provided to enhance a damping effect caused by the gel.

Respective flexible structures 304b of suspensions 304-1, 304-2 are different in shape from each other. Specifically, each of flexible structures 304b of suspension 304-1 is formed by providing cutouts C1 and C2 extending from the negative and positive sides of the Y-axis, respectively. In contrast, each of flexible structures 304b of suspension 304-2 is formed only by providing cutout C3 extending from the negative side of the Y-axis. Structures of suspensions 304-1, 304-2 other than the shapes of flexible structures 304b are identical to each other.

Providing flexible structures 304b allows suspensions 304-1, 304-2 to easily deform in the Z-axis direction. This configuration allows support member 303 supporting structure body 301 and movable screen 108 to move at a high speed in the Z-axis direction.

Furthermore, flexible structure 304b of upper suspension 304-1 is different from flexible structure 304b of lower suspension 304-2, which allows buckling rigidity of suspension 304-1 to differ from buckling rigidity of suspension 304-2. The buckling rigidity herein indicates a degree of difficulty in deformation of suspensions 304-1, 304-2 against external force (compression or tension) in the positive or negative direction of the X-axis, and can be represented by (load/deformation quantity).

The buckling rigidity of upper suspension 304-1 is made different from the buckling rigidity of lower suspension 304-2 in this manner. Therefore, when support member 303 supporting structure body 301 and movable screen 108 is reciprocated at a high frequency in the Z-axis direction, generation of excessive amplitude owing to a resonance mode can be suppressed.

Note that, in the present exemplary embodiment, suspensions 304-1, 304-2 double as a feeding path of the drive signal to coil 341. In the present exemplary embodiment, as described above, support member 303 is formed of a liquid crystal polymer in which a carbon filler is mixed, which makes support member 303 conductive. Accordingly, the configuration in which suspensions 304-1, 304-2 double as a feeding path requires that an attachment structure of suspensions 304-1, 304-2 to support member 303 be electrically insulated.

FIG. 9A and FIG. 9B are exploded perspective views each illustrating the attachment structure of suspension 304-1 to support member 303.

As illustrated in FIG. 9A, fixing member 303e includes screw 351 and two plate-shaped clampers 352. Upper and lower surfaces of each of two clampers 352 are subjected to an oxidation treatment to be electrically insulated. Furthermore, a hole is provided at a center of each of clampers 352. A shaft of screw 351 is smaller in diameter than the hole of clamper 352 and hole 304e of suspension 304-1. Furthermore, hole 304e of suspension 304-1 is made larger in diameter than the hole of clamper 352, which prevents screw 351 from coming into contact with suspension 304-1.

With hole 304e of suspension 304-1 and the respective holes of two clampers 352 aligned with each other, each end of suspension 304-1 is interposed between two clampers 352. In this state, the ends of suspension 304-1 are placed on upper surfaces of connection parts 303d of support member 303, and screws 351 are screwed into threaded holes 303h of connection parts 303d. This causes the ends of suspension 304-1 to be fixed to the upper surfaces of connection parts 303d of support member 303, as illustrated in FIG. 9B. Similarly, lower suspension 304-2 is also fixed to lower surfaces of connection parts 303d.

The upper and lower surfaces of each of two clampers 352 are electrically insulated; thus, even when the ends of suspensions 304-1, 304-2 are screwed in this manner, suspensions 304-1, 304-2 are not electrically connected with support member 303. This configuration allows suspensions 304-1, 304-2 to be appropriately used as the feeding path to coil 341.

After suspensions 304-1, 304-2 are thus mounted on support member 303, an end of coil 341 (refer to FIG. 8A) mounted on outer frame 303b of support member 303 is connected, by soldering, to flanges 304f formed on the ends of suspension 304-1 or suspension 304-2. Furthermore, a lead wire for supplying the drive signal to coil 341 is connected, by soldering, to flanges 304c of suspension 304-1 or suspension 304-2. The drive signal is thus supplied to coil 341 through suspension 304-1 or suspension 304-2.

Next, a configuration of structure body 301 that supports movable screen 108 will be described.

FIG. 10A is an exploded perspective view illustrating a configuration of structure body 301, and FIG. 10B is a perspective view of an assembled body corresponding to structure body 301.

As illustrated in FIG. 10A, structure body 301 includes movable screen 108, holder 361, a heat resistant member (hereinafter, referred to as a "heat resistant packing") 362, and light shielding member 363.

Holder 361 is a frame-shaped member of which a top and a bottom are opened. Holder 361 is formed of a lightweight and highly rigid material. In the present exemplary embodiment, holder 361 is integrally molded of a magnesium alloy. A shape of holder 361 is symmetry with respect to the X-axis direction.

Holder 361 has an approximately rectangular shape in a plan view. A portion of holder 361 on the positive side of the Y-axis is lower than the other portions. Accordingly, an upper surface of holder 361 is sloped in the Z-axis direction relative to a plane parallel to an X-Y plane. On the upper surface of holder 361, stepped part 361a is provided extending along a periphery of holder 361. A depth of stepped part 361a is approximately equal to a thickness of movable screen 108. On each of lower surfaces of holder 361 on the positive side and the negative side of the Y-axis, two engagement parts 361b are provided. Engagement parts 361b are rectangular cutouts extending from the lower surfaces in the positive direction of the Z-axis. On the lower surface of holder 361, a plurality of protrusions 361c are provided extending downward from an inner side of the lower surface.

Heat resistant packing 362 is made of an elastically deformable material that has excellent heat resistance and heat insulation properties. Heat resistant packing 362 is formed of, for example, heat resistant silicone rubber. Heat resistant packing 362 is a frame-shaped member having a substantially square cross-section. Heat resistant packing 362 is shaped to fit into stepped part 361a of holder 361.

Light shielding member 363 is made of a thin plate-shaped member. Light shielding member 363 has a thickness of about 0.2 mm, for example. Light shielding member 363 is formed of a lightweight material that has excellent heat resistance and light shielding properties. Light shielding member 363 is formed of a magnesium alloy, for example. Light shielding member 363 has opening 363a of a rectangular shape. Opening 363a is slightly smaller in size than heat resistant packing 362. On edges of light shielding member 363 on the positive side and the negative side of the Y-axis, hooks 363b that each engage with a corresponding engagement part 361b of holder 361 are provided.

Movable screen 108 is fitted into stepped part 361a of holder 361 such that an end of movable screen 108 on the negative side of the Y-axis comes into contact with an inner wall of stepped part 361a on the negative side of the Y-axis. Moreover, heat resistant packing 362 is put on an upper surface of movable screen 108 and stepped part 361a so as to extend along stepped part 361a. In this state, an upper surface of heat resistant packing 362 protrudes beyond the upper surface of holder 361 in the positive direction of the Z-axis. Then, light shielding member 363 is put over holder 361, and four hooks 363b are engaged with four respective engagement parts 361b of holder 361. At this time, heat resistant packing 362 is compressed by light shielding member 363 in the Z-axis direction. Engagement of hooks 363b with engagement parts 361b is maintained by an elastic restoring force of heat resistant packing 362.

As illustrated in FIG. 10B, assembly of structure body 301 is thus completed. In this state, rectangular gap G1 is present adjacent to a portion of movable screen 108 on the positive side of the Y-axis. When holder 361 is put on inner frame 303a as illustrated in FIG. 4A, protrusions 361c of holder 361 are fitted to an inner side of inner frame 303a. Holder 361 is thus positioned on support member 303. At this time, the lower surface of holder 361 is bonded, with adhesive, to the upper surface of inner frame 303a. As a result, movable screen 108 together with structure body 301 is installed on support member 303.

Next, structure body 302 that supports fixed screen 109 will be described.

FIG. 11A is an exploded perspective view illustrating a configuration of structure body 302, and FIG. 11B is a perspective view of an assembled body corresponding to structure body 302. FIG. 12A is a plan view illustrating a configuration of holder 371, and FIG. 12B is a plan view illustrating holder 371 and fixed screen 109 with fixed screen 109 installed on holder 371.

Structure body 302 includes fixed screen 109, holder 371, light shielding members 372, and screws 373, 374.

As illustrated in FIG. 11A and FIG. 12A, holder 371 is a frame-shaped member. Holder 371 is formed of a lightweight material having a light shielding property. For example, holder 371 is integrally formed by aluminum die-casting.

Holder 371 includes two recesses 371a on which both ends of fixed screen 109 are placed. A portion of each of recesses 371a on the positive side of the Y-axis is lower than the other portions. Accordingly, fixed screen 109 is installed on recesses 371a so as to be sloped in the Z-axis direction relative to the plane parallel to the X-Y plane. On a portion of holder 371 on the negative side of the Y-axis, stepped part 371b is provided protruding in the positive direction of the Z-axis. Furthermore, opening 371c is formed so as to partially overlap stepped part 371b. Opening 371c has a rectangular shape in a plan view.

At an end of each of recesses 371a on the negative side of the Y-axis, threaded hole 371d is provided for receiving screw 373. An upper surface of an area around threaded hole 371d is flush with the upper surface of holder 371 on the positive side of the Y-axis. On the upper surface of holder 371 on the positive side of the Y-axis, two threaded holes 371e are provided for receiving screws 373. At each of ends on the upper surface of holder 371 on the positive side and the negative side of the X-axis, recess 371f is provided. Each of recesses 371f has a hole 371g into which screw 374 is inserted.

Moreover, at each of ends of holder 371 on the positive side and the negative side of the X-axis, leg 371h is provided protruding downward. Therefore, holder 371 has an arch shape as viewed from the positive side of the Y-axis. At an end on the positive side of the Y-axis on a lower surface of leg 371h on the positive side of the X-axis, protrusion 371i of a cylindrical shape is provided protruding downward. Furthermore, at an end on the negative side of the Y-axis on a lower surface of leg 371h on the negative side of the X-axis, protrusion 371*i* of a cylindrical shape (not illustrated) is provided protruding downward.

Light shielding members 372 are each made of a thin plate-shaped member. Light shielding members 372 have a thickness of about 0.2 mm, for example. Light shielding members 372 are each formed of a lightweight material that has excellent heat resistance and light shielding properties. Light shielding members 372 are each formed of a magnesium alloy, for example. Light shielding members 372 each have holes 372*a* through which screws 373 pass.

Fixed screen 109 is placed on recesses 371*a* of holder 371 such that an end of fixed screen 109 on the positive side of the Y-axis comes into contact with an inner wall of holder 371 on the positive side of the Y-axis. Then, fixed screen 109 is bonded, with adhesive, to bottom surfaces of recesses 371*a*. As illustrated in FIG. 12B, with fixed screen 109 installed on recesses 371*a*, both ends of fixed screen 109 are spaced apart, in the positive direction of the Y-axis, from stepped portions in which threaded holes 371*d* are formed. Furthermore, in this state, a portion of fixed screen 109 other than the ends is spaced apart from an inner wall of opening 371*c* on the positive side of the Y-axis. That is, gap G2 is formed between fixed screen 109 and a portion of holder 371 on the positive side of the Y-axis.

After fixed screen 109 is thus installed, two light shielding members 372 are installed, with screws 373, on an upper surface of holder 371. This causes both the ends of fixed screen 109 to be covered by light shielding members 372. As illustrated in FIG. 11B, assembly of structure body 302 is thus completed.

Protrusions 371*i* provided on the respective lower surfaces of two legs 371*h* are fitted into holes 308*d* of magnetic cover 308 illustrated in FIG. 4B, which causes structure body 302 after the assembly to be positioned on the upper surface of magnetic cover 308. Then, two screws 374 are passed through holes 371*g* and screwed into threaded holes 308*c* on the upper surface of magnetic cover 308. As a result, fixed screen 109 together with structure body 302 is installed on magnetic cover 308.

FIG. 13A is a plan view illustrating a configuration around a periphery of magnetic cover 308, before structure body 302 that supports fixed screen 109 is installed on magnetic cover 308. FIG. 13B is a plan view illustrating the configuration around the periphery of magnetic cover 308, with structure body 302 that supports fixed screen 109 installed on magnetic cover 308.

As illustrated in FIG. 13A, before structure body 302 is installed on magnetic cover 308, beams 303*c* of support member 303 are exposed, on the positive side of the Z-axis, through cutouts 308*b* of magnetic cover 308. In contrast, after structure body 302 is installed on magnetic cover 308, as illustrated in FIG. 13B, cutouts 308*b* aligned in the X-axis direction are entirely covered by holder 371, and cutouts 308*b* aligned in the Y-axis direction are almost entirely covered by holder 371. Holder 371 has widths in the X-axis direction and the Y-axis direction that allow holder 371 to cover four cutouts 308*b* as described above.

Cutouts 308*b* are thus covered by holder 371, which prevents stray light such as natural light travelling backward via the optical system including mirror 22 from being condensed to, for example, beams 303*c* of support member 303. This can prevent beams 303*c* and the like from being heated to a high temperature and then damaged. Such light shielding action caused by holder 371 will be described later with reference to FIG. 16.

Next, an image display operation using movable screen 108 and fixed screen 109 will be described.

FIG. 14A is a diagram schematically illustrating the positional relationship between movable screen 108 and fixed screen 109.

In the present exemplary embodiment, as described above, movable screen 108 and fixed screen 109 are supported by holder 361 and holder 371, respectively. This configuration causes drive unit 300 to move only movable screen 108 in the optical axis direction (Z-axis direction). For example, in order to generate a depth image, movable screen 108 is moved within range W1 from position Ps0 to position Ps1. Fixed screen 109 is fixed at position Ps10. Herein, movable screen 108 and fixed screen 109 are shifted from each other by distance D1 in the Z-axis direction. Fixed screen 109 is positioned closer to mirror 22 (optical system) than movable screen 108 is.

Note that a visual distance from driver 2 to the image (virtual image) becomes longer as movable screen 108 moves away from mirror 22 illustrated in FIG. 1C. In other words, position Ps0 is a boundary position of movable screen 108 where the visual distance becomes longest, and position Ps1 is a boundary position of movable screen 108 where the visual distance becomes shortest. Fixed screen 109 is positioned away from movable screen 108 in the positive direction of the Z-axis by distance D1, which causes an image (virtual image) displayed by fixed screen 109 to appear closer to driver 2 than an image (virtual image) displayed by movable screen 108 is.

As described above, the present exemplary embodiment is configured to move only movable screen 108, which allows movable screen 108 to be moved only within range W1 necessary for a depth image to be displayed. This configuration allows movable screen 108 to be moved smoothly at a high speed.

FIG. 14B is a diagram schematically illustrating a scanning method of laser light with respect to movable screen 108 and fixed screen 109.

In the image display operation, movable screen 108 is first scanned with the laser beam. Movable screen 108 is sequentially scanned from scan line L1 set on the most positive side of the Y-axis to scan line Lk. During this scanning, holder 361 is moved toward the positive side of the Z-axis, which in turn moves movable screen 108 from position Ps0 to position Ps1. This process causes the depth image to be displayed. Then, holder 361 is stopped. In this state, fixed screen 109 is sequentially scanned from scan line Lk+1 to scan line Lk. This process causes the fixed image to be displayed.

Note that, in the present exemplary embodiment, after the display operation of the fixed image is completed, an image whose visual distance is not varied (hereafter, referred to as a "vertical image") is displayed with movable screen 108 during a process in which movable screen 108 is returned to position Ps0. The vertical image is an image for marking a pedestrian, for example, and is displayed so as to be superimposed on the pedestrian at a position corresponding to a visual distance of the pedestrian. In this process, movable screen 108 is sequentially scanned from scan line Lk to scan line L1.

FIG. 15A is a graph illustrating an example of driving movable screen 108 when an image illustrated in FIG. 15B is displayed in region S1.

Movable screen 108 is repeatedly moved with a period from time t0 to time t5 taken as one cycle. During a period from time t0 to time t1, movable screen 108 is moved from position Ps0 (farthest position) to position Ps1 (nearest position), and during a period from time t2 to time t5, movable screen 108 is returned from position Ps1 (nearest position) to position Ps0 (farthest position). During a period from time t1 to time t2, movable screen 108 is stopped at position Ps1 (nearest position). A movement cycle of movable screen 108, that is, the period from time t0 to time t5 is 1/60 seconds, for example. Movable screen 108 is moved as illustrated in FIG. 15A by changing a current applied to coil 341 described above while monitoring an output of the encoder of position detection unit 400.

In FIG. 15B, the period from time t0 to time t1 is a period for displaying depth image M1 extending in the depth direction, and the period from time t2 to time t5 is a period for displaying vertical image M2 extending in the vertical direction. In FIG. 15B, the period from time t1 to time t2 is a period for displaying fixed image M3 in region S2.

During the period from time t0 to time t1, laser light sources 101a to 101c are caused to emit light at timing corresponding to depth image M1 on scan lines corresponding to depth image M1 while movable screen 108 is linearly moved from position Ps0 to position PS1, which causes depth image M1 as illustrated in FIG. 15B to be displayed in region S1 as a virtual image.

Furthermore, movable screen 108 is stopped at position Ps1 during the period from time t1 to time t2. During this period, fixed screen 109 is scanned with the laser beam. Laser light sources 101a to 101c are caused to emit light at timing corresponding to fixed image M3 on scan lines corresponding to fixed image M3, which causes fixed image M3 to be displayed in region S2 ahead of projection region 13.

Next, during the period from time t2 to time t5, movable screen 108 is returned to position Ps0. At this time, movable screen 108 is stopped at position Ps2 during a period from time t3 to time t4. During this period, laser light sources 101a to 101c are caused to emit light at timing corresponding to vertical image M2 on scan lines corresponding to vertical image M2, which causes vertical image M2 as illustrated in FIG. 15B to be displayed ahead of projection region 13 of windshield 12.

The above-described control is performed by image processing circuit 201 illustrated in FIG. 2. Such control causes depth image M1 and vertical image M2 to be displayed in region S1 as virtual images, and further causes fixed image M3 to be displayed in region S2 as a virtual image, during the period from time t0 to time t5. In the above-described control, respective display timings of depth image M1, vertical image M2, and fixed image M3 are different from each other; however, the differences are extremely small, which allows driver 2 to recognize a superimposed image including depth image M1, fixed image M3, and vertical image M2. Accordingly, driver 2 can view an image based on the video signal (depth image M1, vertical image M2, and fixed image M3) that has been superimposed on a scene including road R1 and pedestrian H1.

Note that, in the example of FIG. 15B, one vertical image M2 is present, and therefore one stop position (position Ps2) of movable screen 108 is set in the process of FIG. 15A. However, when a plurality of vertical images M2 are present, a plurality of stop positions are set accordingly in the process of FIG. 15A. Note that, in the process of FIG. 15A, the period from time t0 to time t5 is constant, and time t5 is unchanged. Therefore, the movement speed of movable screen 108 (slope of a waveform in FIG. 15A) before and after the stop positions is changed in response to fluctuations in the number of stop positions.

Effects of Exemplary Embodiment

According to the above-described exemplary embodiment, the following effects are exerted.

The exemplary embodiment is configured to move only movable screen 108, which allows movable screen 108 to be moved only within a range necessary for a depth image to be displayed. This configuration allows movable screen 108 to be moved smoothly at a high speed.

Furthermore, structure body 302 (holder 371) that supports fixed screen 109 covers an area around opening 308a of magnetic cover 308 to block stray light travelling backward via the optical system (mirror 22). This prevents an area around movable screen 108 from being irradiated with stray light of high intensity and then prevents the movable part (support member 303) located around movable screen 108 from being heated to a high temperature by the stray light. Accordingly, the movable part (support member 303) located around movable screen 108 can be suitably protected from such stray light.

FIG. 16 is a diagram describing this effect. FIG. 16 is a cross-sectional view of structure body 302 taken along a plane parallel to the Y-Z plane. In FIG. 16, broken lines with arrows indicate stray light that has travelled backward via mirror 22 and condensed.

Stray light travelling toward support member 303 is blocked by magnetic cover 308. Furthermore, stray light travelling toward cutouts 308b of magnetic cover 308 is blocked by holder 371 of structure body 302. As illustrated in FIG. 13B, ends of cutouts 308b aligned in the Y-axis direction are not covered by holder 371. However, as illustrated in FIG. 16, stray light diagonally travels outward by the action of mirror 22 (optical system). This prevents stray light from reaching support member 303 through the ends of cutouts 308b that are not covered by holder 371. Accordingly, stray light travelling toward support member 303 (beams 303c) through cutouts 308b are completely blocked by holder 371. Therefore, the movable part (support member 303) located around movable screen 108 can be suitably protected from stray light.

As described above, image display device 20 according to the present exemplary embodiment is capable of moving movable screen 108 for generating a depth image smoothly at a high speed and suitably protecting the movable part located around movable screen 108 from stray light.

Note that stray light passing through opening 371c of holder 371 and stray light passing through fixed screen 109 are both blocked by light shielding member 363 of holder 361 that supports movable screen 108. Accordingly, the present exemplary embodiment can also prevent such stray light from reaching support member 303.

Furthermore, the present exemplary embodiment has a configuration in which holder 371 has a light shielding property, and is adjusted in width so as to cover the area around opening 308a of magnetic cover 308. This eliminates the need for structure body 302 to include any light shielding member that covers the area around opening 308a other than holder 371. According to the present exemplary embodiment, the configuration can be simplified, and costs can be reduced.

Note that, in the present exemplary embodiment, holder 371 is irradiated with stray light, which may significantly increase the temperature of holder 371. To address such a possibility, in the present exemplary embodiment, as illustrated in FIG. 11B, installation areas for fixed screen 109 (recesses 371a illustrated in FIG. 11A) are shielded by light shielding members 372, which prevents the temperature of the installation areas (recesses 371a illustrated in FIG. 11A) with which fixed screen 109 directly comes into contact from being significantly increased. This can prevent fixed screen 109 from being damaged by an increase in the temperature of the installation areas (recesses 371a illustrated in FIG. 11A) caused by stray light.

Furthermore, in the present exemplary embodiment, the gap is formed in the Z-axis direction between light shielding members 372 and the ends of fixed screen 109. Thus, even when light shielding members 372 are increased in temperature by irradiation with stray light, heat generated in light shielding members 372 is prevented from directly transmitting to fixed screen 109. Accordingly, fixed screen 109 can be prevented from being damaged by the increase in the temperature of light shielding members 372 caused by stray light.

Furthermore, in the present exemplary embodiment, as illustrated in FIG. 12B, gap G2 is formed between fixed screen 109 and a portion of holder 371 on the positive side of the Y-axis. Thus, even when the portion of holder 371 on the positive side of the Y-axis is increased in temperature by irradiation with stray light, heat generated in the portion is prevented from directly transmitting to fixed screen 109. Accordingly, fixed screen 109 can be prevented from being damaged by the increase in the temperature of holder 371 caused by stray light.

Furthermore, in the present exemplary embodiment, structure body 302 is installed on magnetic cover 308, which allows structure body 302 to be housed compactly and allows the positional relationship between movable screen 108 and fixed screen 109 to be suitably maintained.

Furthermore, in the present exemplary embodiment, drive unit 300 includes coil 341 installed on the movable part (support member 303), and magnetic circuit 307 that applies a magnetic field to coil 341, which allows movable screen 108 to be moved smoothly at a high speed. Furthermore, magnetic cover 308 is made of a magnetic material, and covers magnetic circuit 307 to function as a yoke of magnetic circuit 307, which makes it possible to reduce a number of components and to shield the movable part (support member 303) from stray light.

Furthermore, in the present exemplary embodiment, as illustrated in FIG. 10A, heat resistant packing 362 is interposed between movable screen 108 and light shielding member 363. Thus, even when light shielding member 363 is increased in temperature by irradiation with stray light, heat generated in light shielding member 363 is prevented from directly transmitting to movable screen 108. Accordingly, movable screen 108 can be prevented from being damaged by the increase in the temperature of light shielding member 363 caused by stray light.

Furthermore, in the present exemplary embodiment, as illustrated in FIG. 10A and FIG. 10B, stepped part 361a is shielded by light shielding member 363, which prevents stepped part 361a from being heated to a high temperature by stray light. Accordingly, movable screen 108 can be prevented from being damaged by heat from stepped part 361a.

Modification Example

Although the exemplary embodiment of the present disclosure has been described above, the present disclosure is not limited to the exemplary embodiment described above, and moreover, a variety of modifications can be applied to application examples according to the present disclosure besides the exemplary embodiment described above.

For example, in the exemplary embodiment, structure body 302 is installed on magnetic cover 308. Alternatively, structure body 302 may be installed on support base 306 or fixing base 310. Note that, as in the exemplary embodiment, the configuration in which structure body 302 is installed on magnetic cover 308 allows structure body 302 to be housed more compactly.

Furthermore, in the exemplary embodiment, as illustrated in FIG. 13B, the ends of cutouts 308b aligned in the Y-axis direction are not covered by holder 371. In a case where stray light enters through the ends due to the action of the optical system (mirror 22), holder 371 may be increased in width in the Y-axis direction so as to entirely cover cutouts 308b aligned in the Y-axis direction. The widths of holder 371 in the X-axis direction and the Y-axis direction may be appropriately adjusted in order to shield the movable part from stray light.

Furthermore, in the exemplary embodiment, the movable part (support member 303, structure body 301) is shielded from stray light by holder 371. Alternatively, a separate light shielding member may be installed on holder 371 so that both the light shielding member and holder 371 blocks stray light. However, this configuration increases both the number of components and a workload required for assembly as compared to the exemplary embodiment.

Furthermore, in the exemplary embodiment, movable screen 108 and fixed screen 109 are installed to be sloped with respect to a plane perpendicular to the Z-axis; however, both or either of movable screen 108 and fixed screen 109 may be installed to be perpendicular to the Z-axis. Slope angles of movable screen 108 and fixed screen 109 can be appropriately adjusted. Furthermore, shapes and sizes of movable screen 108 and fixed screen 109 are also not limited to those described in the exemplary embodiment.

Furthermore, in the exemplary embodiment, an example has been given in which the present disclosure is applied to the head-up display mounted on passenger vehicle 1; however, the present disclosure is not limited to such an on-vehicle application, but is also applicable to other types of image display devices.

Moreover, the configurations of image display device 20 and irradiation light generator 21 are not limited to the configurations illustrated in FIG. 1C and FIG. 2, and can be modified as appropriate. Furthermore, the configuration of drive unit 300 that moves movable screen 108 is not limited to the configuration described in the exemplary embodiment and can be modified as appropriate. For example, a configuration in which a drive unit of a piezoelectric type or an electrostatic type drives movable screen 108 may be employed.

The exemplary embodiment of the present disclosure can be modified in various ways as appropriate within the scope of the technical idea disclosed in the claims.

The image display device according to the present disclosure is capable of moving a screen for generating a depth image smoothly at a high speed and suitably protecting the movable part located around the screen from stray light. Therefore, the present disclosure is industrially useful.

What is claimed is:
1. An image display device comprising:
a light source;
a movable screen that is irradiated with light from the light source to form an image;
a fixed screen that is irradiated with the light from the light source to form an image;
a scanning unit that uses the light from the light source to scan the movable screen and the fixed screen;
an optical system that uses light from the movable screen and light from the fixed screen to generate a virtual image;

a drive unit that moves the movable screen in an incident direction of the light incident from the light source on the movable screen;

a fixed support part that supports the fixed screen at a fixed position such that the fixed screen is closer to the optical system than the movable screen is; and a cover that covers the drive unit, wherein the cover has an opening that guides the light from the scanning unit to the movable screen and the light from the scanning unit to the fixed screen, the drive unit is configured to support the movable screen so as to allow the movable screen to protrude toward the optical system through the opening, and the fixed support part is configured to cover an area of the cover around the opening to shield a movable part of the drive unit from stray light travelling backward via the optical system.

2. The image display device according to claim 1, wherein the fixed support part includes a holder that has a light shielding property and supports the fixed screen, and the holder is configured to cover the area around the opening.

3. The image display device according to claim 2, wherein the fixed support part includes a light shielding member that shields the holder from the stray light at an installation position of the fixed screen.

4. The image display device according to claim 3, wherein the light shielding member is installed on the holder such that a gap is formed between the light shielding member and the fixed screen.

5. The image display device according to claim 1, wherein the fixed support part is installed on the cover.

6. The image display device according to claim 1, wherein the cover includes a cutout that extends outward from the opening and through which a support member that supports the movable screen is partially inserted, and the fixed support part is configured to cover the cutout.

7. The image display device according to claim 1, wherein the drive unit includes:

a coil that is installed on the movable part; and a magnetic circuit that applies a magnetic field to the coil, and the cover is made of a magnetic material, and covers the magnetic circuit to function as a yoke of the magnetic circuit.

* * * * *